March 9, 1954     R. IREDELL ET AL     2,671,495
APPARATUS FOR STORING AND FEEDING WEB MATERIAL
Filed July 8, 1949     11 Sheets-Sheet 1

INVENTORS
Robert Iredell
Chester R. Kolk
Emil A. Schreier
BY Evans & McCoy
ATTORNEYS

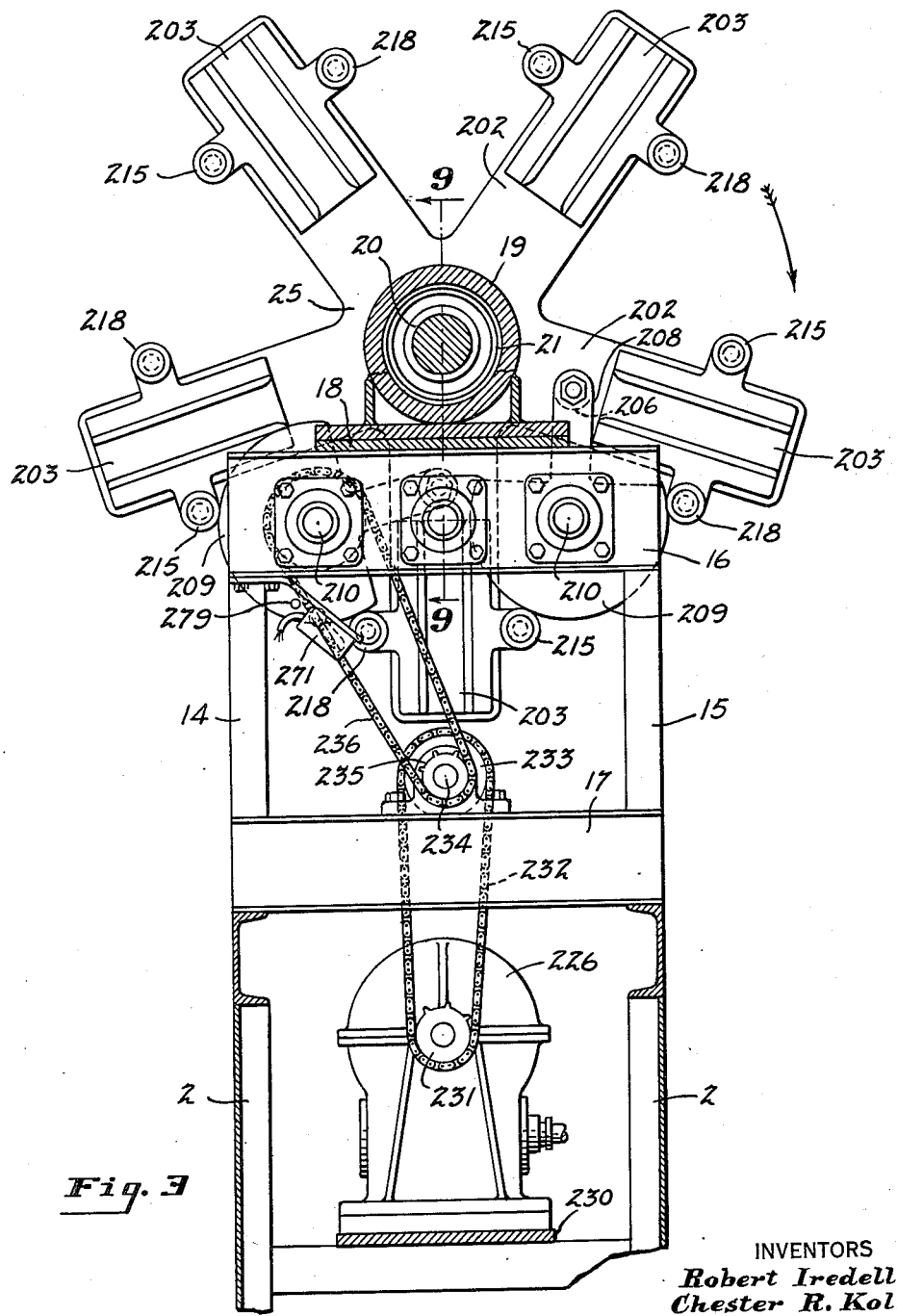

March 9, 1954 R. IREDELL ET AL 2,671,495
APPARATUS FOR STORING AND FEEDING WEB MATERIAL
Filed July 8, 1949 11 Sheets-Sheet 4
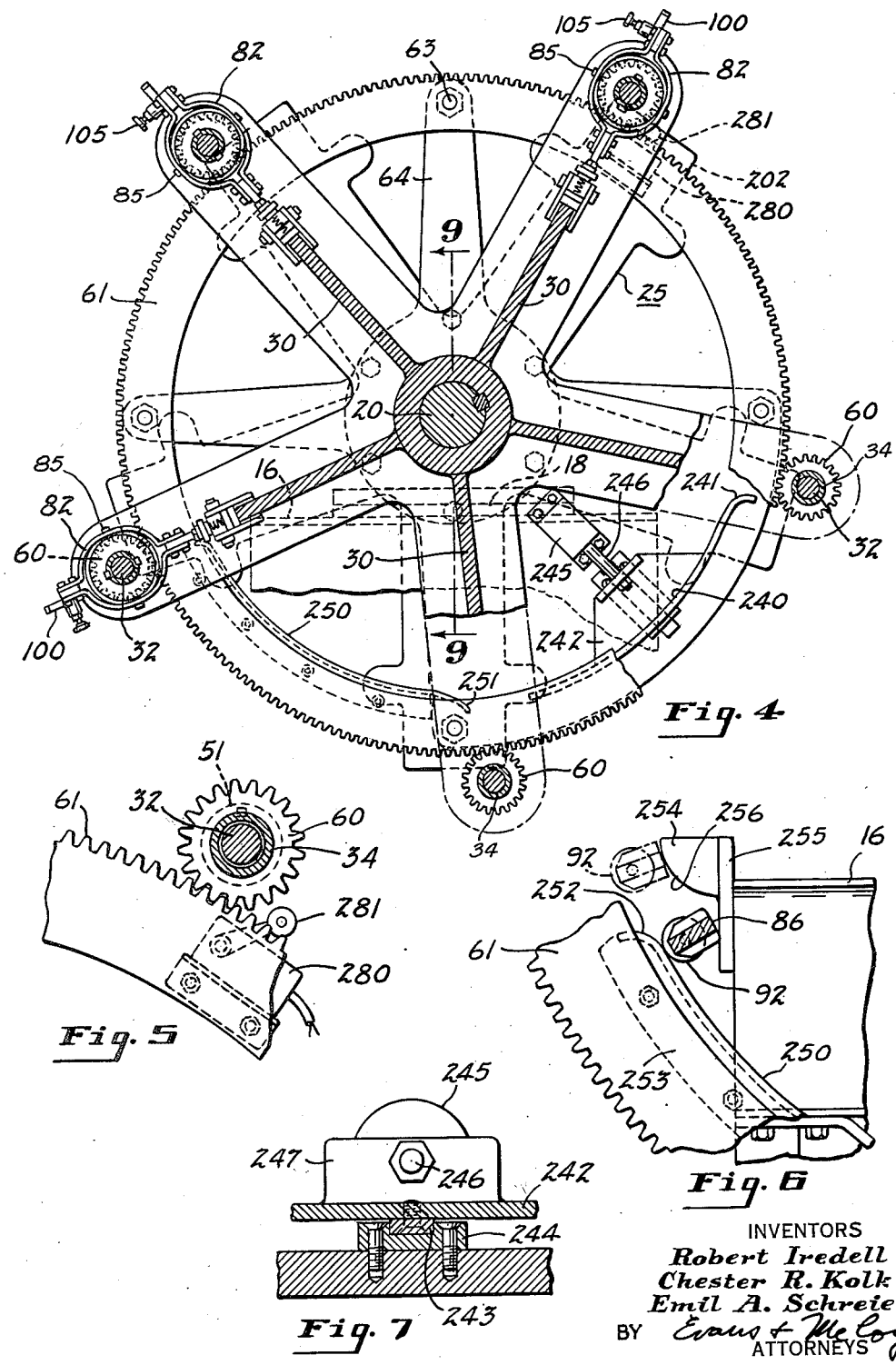
INVENTORS
Robert Iredell
Chester R. Kolk
Emil A. Schreier
BY Evans & McCoy
ATTORNEYS

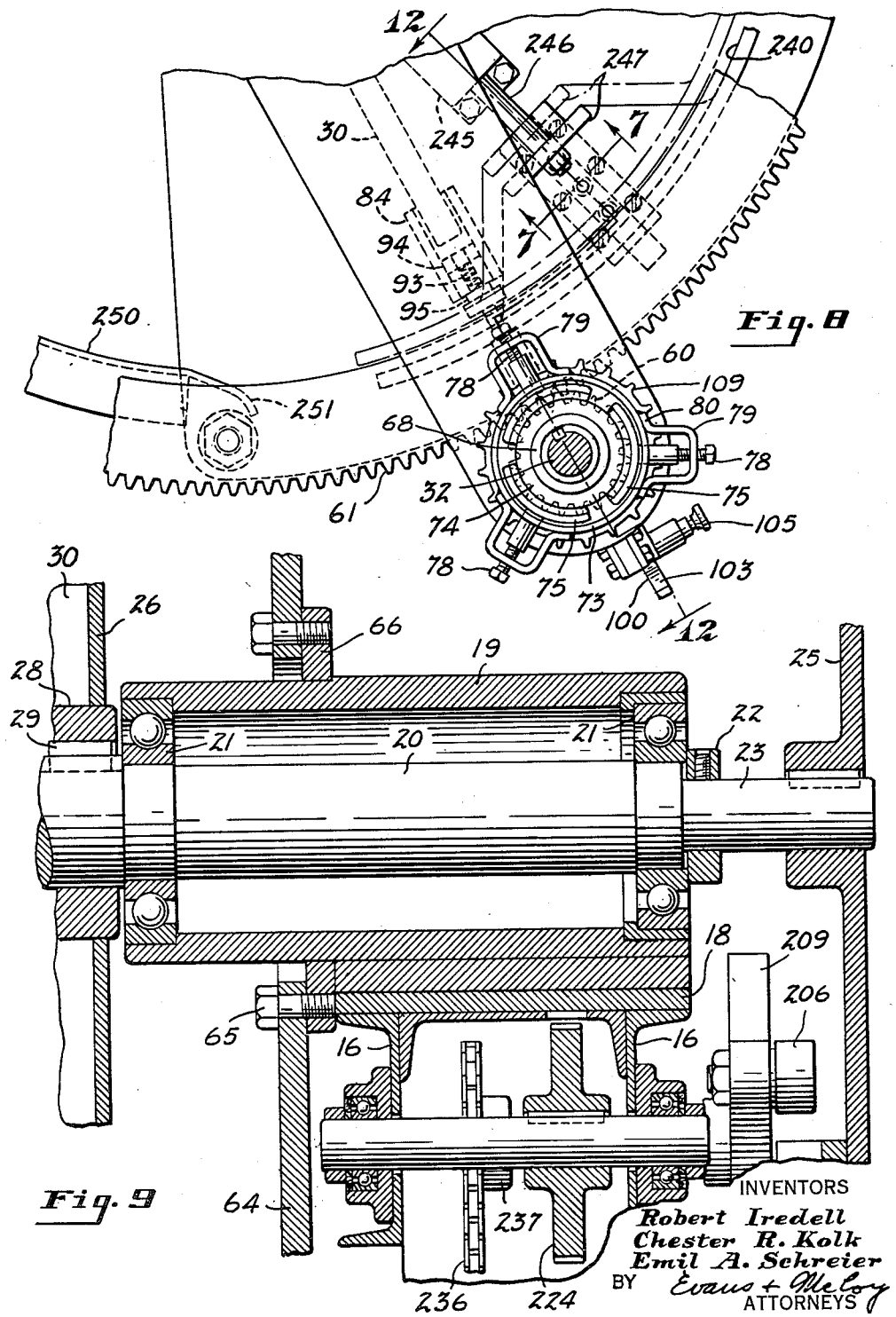

March 9, 1954 R. IREDELL ET AL 2,671,495
APPARATUS FOR STORING AND FEEDING WEB MATERIAL
Filed July 8, 1949 11 Sheets-Sheet 6

INVENTORS
Robert Iredell
Chester R. Kolk
Emil A. Schreier
BY Evans + McCoy
ATTORNEYS

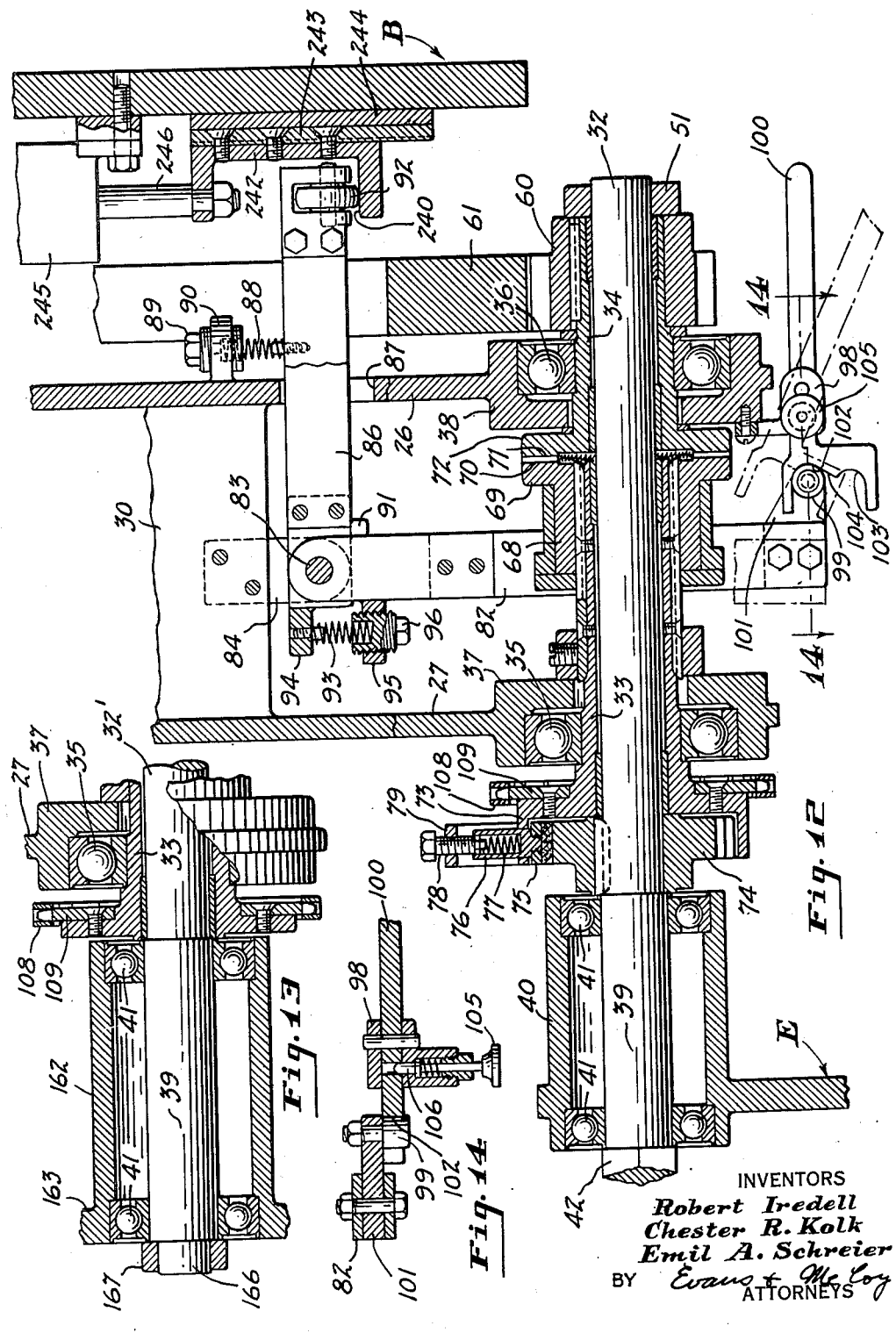

March 9, 1954  R. IREDELL ET AL  2,671,495
APPARATUS FOR STORING AND FEEDING WEB MATERIAL
Filed July 8, 1949  11 Sheets-Sheet 8
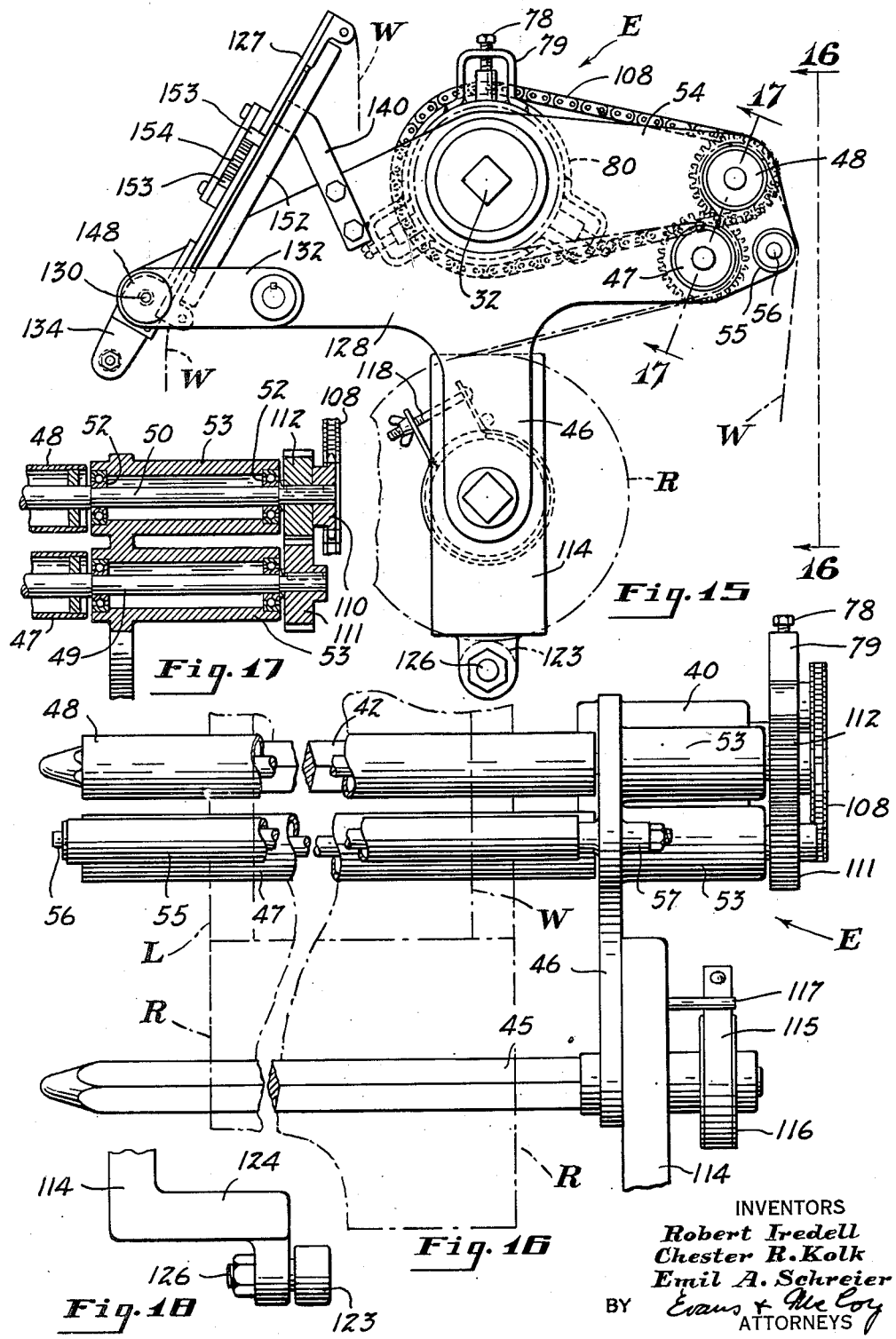
INVENTORS
Robert Iredell
Chester R. Kolk
Emil A. Schreier
BY Evans & McCoy
ATTORNEYS March 9, 1954   R. IREDELL ET AL   2,671,495
APPARATUS FOR STORING AND FEEDING WEB MATERIAL
Filed July 8, 1949   11 Sheets-Sheet 9
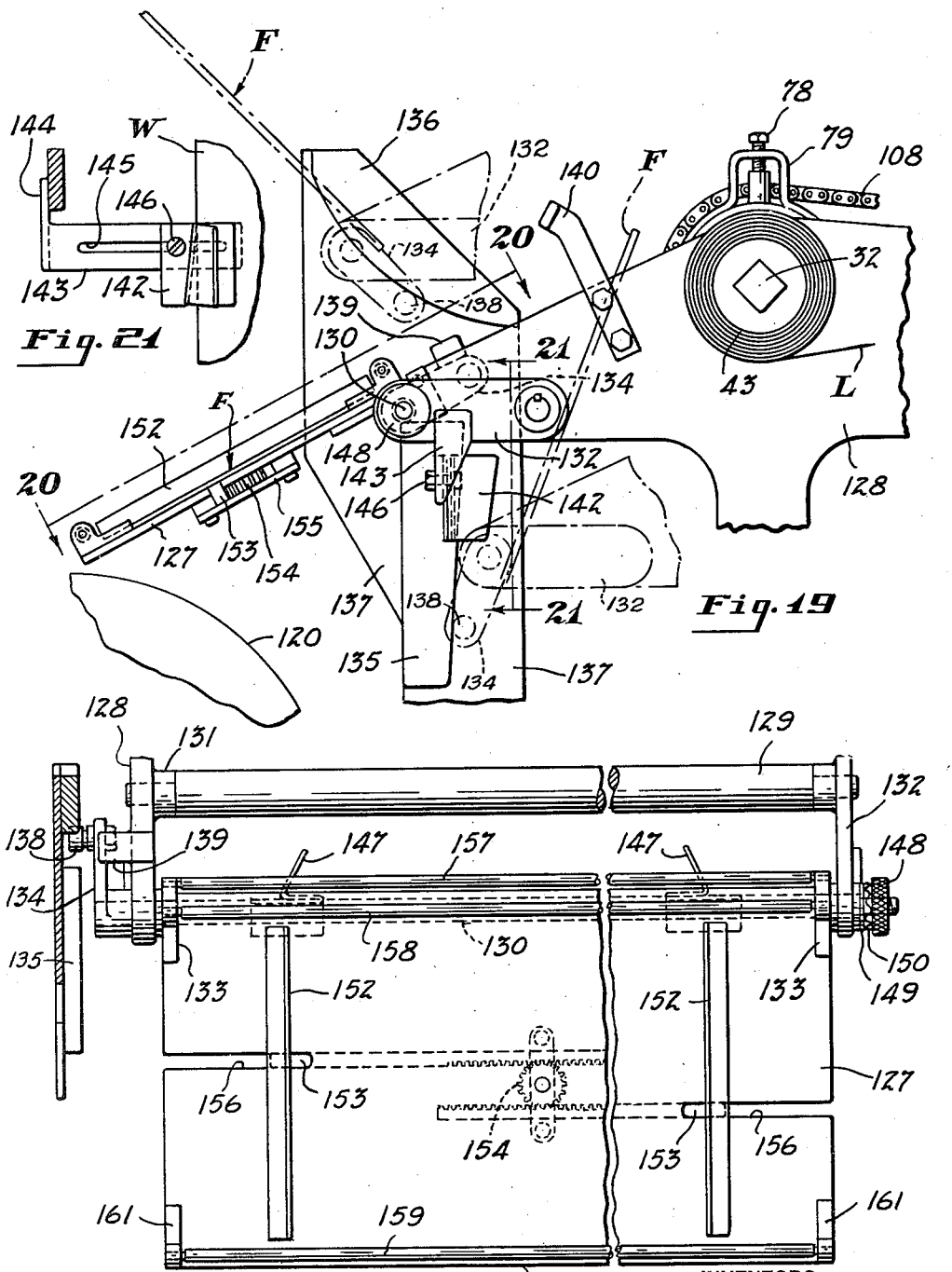
INVENTORS
Robert Iredell
Chester R. Kolk
Emil A. Schreier
BY
ATTORNEYS

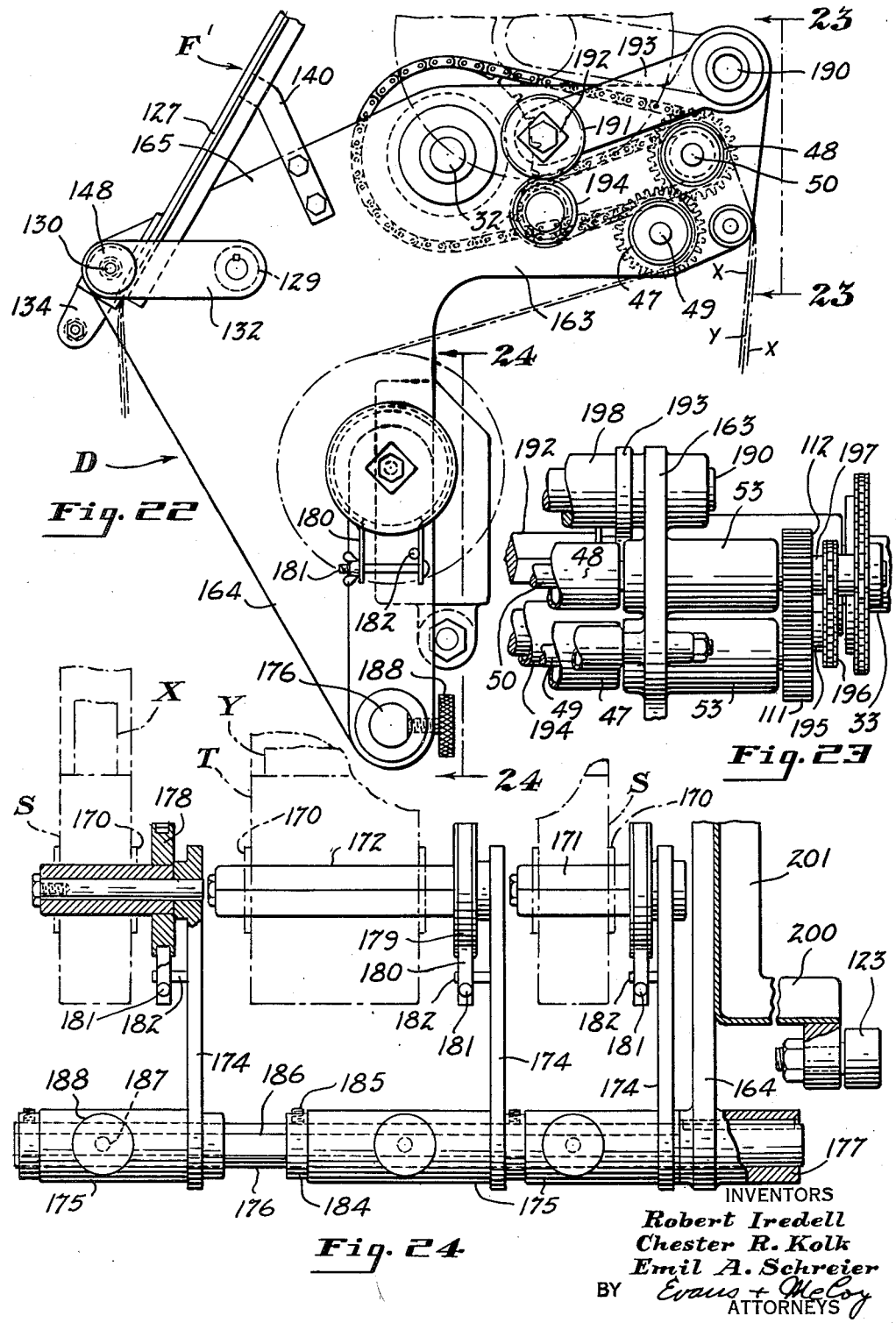

Patented Mar. 9, 1954

2,671,495

UNITED STATES PATENT OFFICE 2,671,495

APPARATUS FOR STORING AND FEEDING WEB MATERIAL

Robert Iredell, Chester R. Kolk, and Emil A. Schreier, Akron, Ohio, assignors to The General Tire and Rubber Company, Akron, Ohio, a corporation of Ohio Application July 8, 1949, Serial No. 103,546

38 Claims. (Cl. 154—10)

This invention relates to the handling of flexible continuous strip materials, more particularly to the storing of continuous strips of fabric or ply material such as used in the manufacture of vehicle tires and the intermittent feeding of lengths of such material. In the building of articles such as pneumatic tires, a number of layers or plies comprising parallel cords embedded in rubber are superimposed or built up one on top of another about a form with the cords of successive plies extending in different directions. The efficiency of this building operation has been so increased by improvements in tire building machinery, particularly automatic and semi-automatic machines, that the speed and economy of the over all tire building operation is largely influenced by the manner in which the ply material layers or webs are supplied to the operator of the tire building machine.

It is therefore one of the principal objects of the present invention to provide a generally improved apparatus for storing continuous strip web or ply material and feeding the same to a tire building machine in such manner as to make the ply material readily available to the operator of the machine. As a preferential arrangement, it is sought to provide such an apparatus which stores a plurality of different kinds or rolls of web material and feeds the several kinds of material or differently arranged rolls thereof to the machine operator in a predetermined order or sequence.

A particularly advantageous feature of the invention is the provision of a multiple roll web or strip storing apparatus which includes means for feeding the several flexible strips into invidiual festoons so that adequate, preferably slightly excess, quantities or lengths of the strips are readily available to the operator as the strips or webs are brought into feeding or service position for use.

Another object of the invention is to provide in combination with a tire building machine or the like, an improved servicer or stock storing and feeding apparatus carrying a multiplicity of web supply rolls, the rolls being preferably mounted to move bodily in an orbital or circular path about a generally horizontal axis in a Ferris wheel arrangement. Among the features associated with the multiple web or strip roll arrangement are improvements in the mechanism for rotating or indexing the wheel carrying the several web rolls to bring the free ends of the strips sequentially to a predetermined service or take-off station, improvements in the carriages carried by the wheel for supporting the web rolls, and improvements in the supporting and guiding means for correctly positioning the free end of each web convenient to the operator at the withdrawal or service station.

Other objects and advantages relate to certain novel combinations and arrangements of parts and features of control, design, and construction which are set forth in the following detailed description of an apparatus embodying the invention. The description is made in connection with the accompanying drawings forming a part of the specification and in which like parts throughout the several views are indicated by the same letters and numerals of reference.

In the drawings:

Fig. 3 is a vertical sectional view, with parts broken away and removed, through the main frame of the machine, this view being taken transverse to the wheel supporting shaft substantially along the line indicated at 3—3 of Fig. 2;

Fig. 4 is a fragmentary sectional view with parts broken away and removed taken substantially along the line indicated at 4—4 of Fig. 2 and enlarged with respect thereto;

Fig. 5 is an enlarged fragmentary elevational detail showing the connection between one of the spur gears for driving the web feed rolls and the ring gear;

Fig. 6 is a fragmentary elevational detail showing the cam track and the positive acting drive release for actuating the web feeding clutches;

Fig. 7 is a sectional detail showing the slide that carries the clutch actuating track and the slideway or guide for such slide, this view being taken substantially along the line indicated at 7—7 of Fig. 8 and enlarged with respect to that figure;

Fig. 8 is a fragmentary elevational detail of a portion of the structure shown in Fig. 4 and enlarged with respect to that figure, one of the web roller supporting arms being illustrated in a different or displaced position and the sprocket for actuating the chain that drives the web feed rolls and the liner take up roll being included;

Fig. 9 is a fragmentary sectional detail taken longitudinally of the main wheel supporting shaft substantially along the line indicated at 9—9 of Fig. 4 and enlarged with respect to that figure;

Fig. 12 is a fragmentary sectional detail with parts broken away and removed, taken longitudinally of the supporting shaft of one of the carriages that mount the continuous ply material webs and showing the drive clutch and actuating mechanism therefor, this view being taken substantially along the circumferentially offset line indicated at 12—12 of Fig. 8 and enlarged with respect to that figure;

Fig. 13 is a fragmentary sectional detail similar to the left hand end of Fig. 12 to show the corresponding parts employed in the chafer and breaker strip carriage;

Fig. 14 is a sectional detail through the manual clutch release, this view being taken substantially along the line indicated at 14—14 of Fig. 12;

Fig. 15 is an end elevational view, partly diagrammatic and with parts removed, showing one of the carriages for mounting the continuous web supply rolls, this view being enlarged with respect to Figs. 1 and 2 and the corresponding view of the carriage for mounting the chafer and breaker strip supply rolls being shown in Fig. 22;

Fig. 16 is a foreshortened side elevational view of one of the web supply roll carriages, with parts broken away, this view being taken substantially along the line indicated at 16—16 of Fig. 15;

Fig. 17 is a fragmentary sectional detail showing the bearing arrangement and drive for one of the pairs of web feeding rolls, this view being taken substantially along the line indicated at 17—17 of Fig. 15;

Fig. 18 is a fragmentary elevational view showing the roller on one of the ply material carriages which engages in a guideway in the frame structure to control the swinging movement of the carriage and position the carriage in predetermined position at the take-off station, this view being a continuation of the bottom of Fig. 16;

Fig. 19 is a fragmentary elevational view, partly diagrammatic and with parts removed, showing one of the carriages at the take-off station, the full lines showing the ply supporting and guiding board or table in service position and the broken lines showing positions of the ply table or board as it moves to and from the service position;

Fig. 20 is a fragmentary and foreshortened plan view of the ply board or table, parts being removed and parts being shown in section, this view being taken substantially along the line indicated at 20—20 of Fig. 19;

Fig. 21 is a sectional detail showing the construction of one of the ply material guides used on the carriages, this view being taken substantially along the line indicated at 21—21 of Fig. 19;

Fig. 22 is an elevational view, partly diagrammatic and with parts broken away and removed, showing the chafer and breaker strip carriage, the corresponding view of one of the web supply carriages being shown in Fig. 15;

Fig. 23 is a fragmentary elevational detail showing the drive for the chafer and breaker strip feed rolls, this view being taken substantially along the line indicated at 23—23 of Fig. 22;

Figure 25:
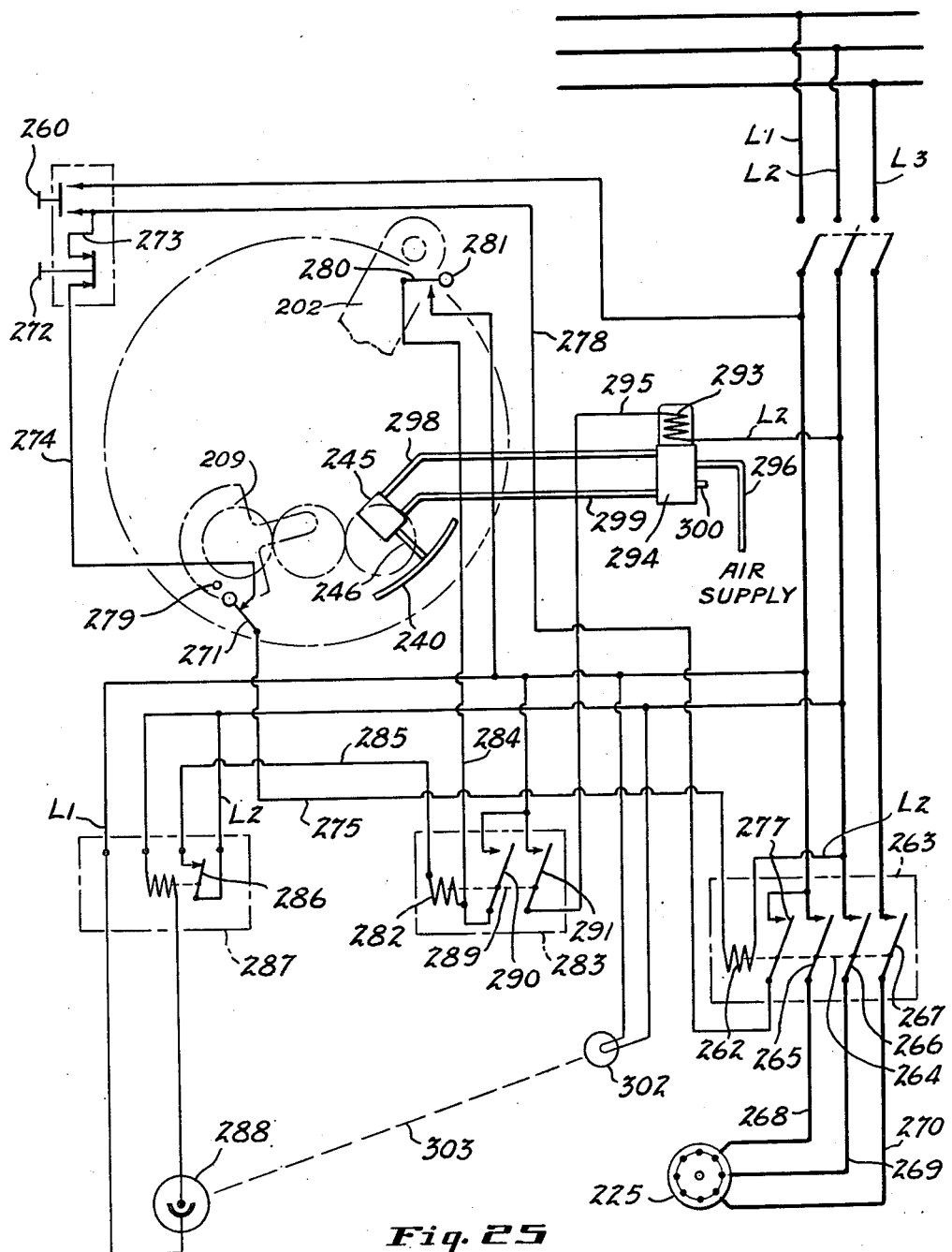

Fig. 24 is a fragmentary view, partly in section and with parts removed, showing the arms for mounting the liner take-up rolls on the chafer and breaker strip carriage, this view being taken substantially along the line indicated at 24—24 of Fig. 22; and Fig. 25 is an electrical wiring and pneumatic piping diagram showing suitable control elements and connections for governing the operation of the various components of the servicer.

The servicer of the present invention is shown in association with a semi-automatic tire building machine indicated generally at A. The tire builder is of the type used to make tires by the so called flat band process. Other types of tire building machines may, of course, be serviced by the ply or web supply apparatus of the present invention. The servicer includes a supporting structure B upon which is mounted a turret or carrier wheel C carrying a chafer and breaker strip supply carriage D and a plurality of ply material supply roll carriages E. Each of the carriages includes a relatively movable supporting board or table F which guides the web material at the operating station as the web material is drawn onto the tire builder by the operator.

Frame structure

The frame structure comprises pairs of inner and outer channel uprights 1 and 2 connected by top and bottom cross members 3 and 4 and secured to a base plate 5. The edges of the base plate are received and supported in spaced parallel guides 6 on a floor plate 7 so that the servicer or web supply apparatus can be shifted laterally in adjusting it with respect to the tire builder A. Different sizes of tires can thus be built using the one servicer. A threaded rod 8 is received in a threaded block 9 secured to the base plate 5 so that turning of the rod as by a crank applied to square end 10 thereof operates to shift the servicer in the guides 6. The rod 8 is held against axial movement by suitable collars engaging the sides of a bracket 11 secured to the floor plate 7.

The frame includes a superstructure comprising channel uprights 14 and 15 which may be continuations of the channel uprights 2 or may be supplemental pieces welded onto the latter. The upper and lower cross channels 16 and 17 extend horizontally in pairs between the superstructure uprights 14 and 15 and the uprights are surmounted by a horizontal plate member 18 to which is secured a centrally disposed cylindrical journal housing or tube 19. This housing carries main wheel or turret shaft 20 that turns about a horizontal axis in bearings 21 secured in the ends of the journal tube 19. The shaft 20 is formed with different diameters providing shoulders which locate it with respect to the bearings 21 and prevent axial shifting movement of the shaft. A collar 22 is secured on reduced diameter end portion 23 of the shaft and engages against the outside of one of the bearing assemblies, the other bearing engaging against a circumferential shoulder on the shaft to prevent endwise movement of the shaft.

The main shaft 20 projects through both ends of the journal tube 19, the shaft ends being thus supported in cantilever fashion. A multiple armed drive or star wheel 25, to be later described, has an axially extending hub portion keyed on the reduced diameter end 23 of the main shaft. The other end of the main shaft carries the Ferris wheel structure or carrier C that mounts the chafer and breaker carriage D and the ply web carriages E. The wheel C comprises a pair of spider members or star wheels 26 and 27 having a common hub 28 keyed to the main shaft as indicated at 29. The arms of the two star wheels are arranged in pairs connected by cross webs 30. The illustrated wheel has five pairs of arms, this number corresponding to the number of carriages required to carry the desired number of stocks or kinds of ply material webs that are to be supplied to the tire builder A. In the present instance, four ply rolls and one set of chafer and breaker strips are carried by the servicer. Servicers may be similarly constructed employing a different number of arms and having a different number of carriages.

*Carriage construction*

The ply web or festoon carriages E are carried on cantilever shafts or rods 32 (Fig. 12) journaled in aligned, coaxial sleeves 33 and 34 rotatable in ball bearing assemblies 35 and 36, respectively, carried in recessed ends 37 and 38 of the spider arms 27 and 26, respectively. That portion of each of the shafts 32 which is carried by the sleeves 33 and 34 is of reduced diameter with respect to an adjacent shaft portion 39 that rotatably supports a generally T-shaped carriage frame member.

The frame members of the ply material carriages E are formed with tubular hub portions 40 that rotate on the shaft portions 39, the hubs being supported on and restrained against axial movement by ball bearing assemblies 41. Beyond the tubular hubs 40 the carriage shafts are of square or other non-circular section as indicated at 42, these square shaft portions receiving take-up spools 43 about which duck or liner strips L are wound as the liners come from supply rolls R.

The supply rolls comprise continuous strips or webs W of bias cut cords embedded in rubber. The strips are wound about bobbins or core spools 44 in a separate operation, the liner strips L being wound between the layers of the webs W to prevent sticking together of the tacky uncured rubber. The core spools 44, which may be the same as the take-up spools 43, are formed of metal or wood with through axial apertures matching the square or non-circular portions 42 of the main or take-up shafts of the carriages and similarly shaped cantilever shafts 45 carried by depending arms 46 of the ply web carriages E.

Figure 1:
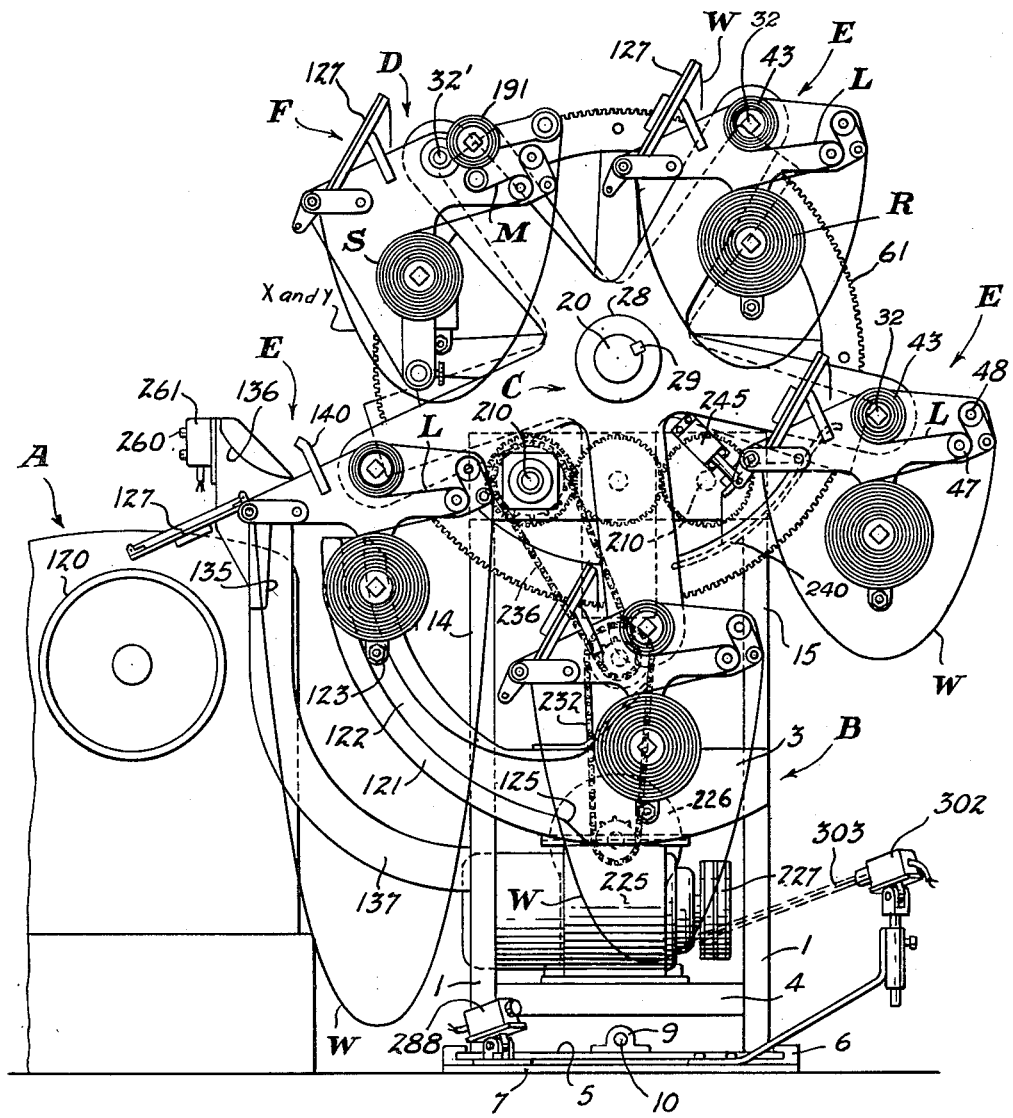
Figure 1 is a side elevational view of a web storing and feeding apparatus or servicer positioned adjacent and in servicing relation to a semi-automatic tire building machine, parts being removed and parts being broken away, this view being taken substantially along the line indicated at 1—1 of Fig. 2.

From the supply rolls R, the ply material webs W and the liners L are carried around fabric covered friction feed rollers 47 and 48 which are clutch driven and operate to draw the webs and liners from the supply rolls, the webs being suspended in festoons as shown in Fig. 1. The liners L, after passing about the friction drive rollers 47, are wound about the take-up spools 43.

The rollers 47 and 48 comprise metal tubes about which covers of canvas or other fabric are adhesively secured. The roller tubes are secured on parallel shafts 49 and 50 journaled as by ball bearing assemblies 52 in elongated tube portions 53 carried by laterally extending arm portions 54 of the ply web carriages E. On each of the web carriages a freely rotating guide roller 55 is mounted on a shaft 56 and parallels the feed rolls 47 and 48 to engage the underside of the web W as it comes off the upper feed roller 48 so as to hold the web away and strip it from the feed rolls. The shafts 56 are supported cantilever fashion in elongated bosses 57 in the outer ends of the carriage arms 54.

The drive for actuating the feed rolls and the take-up spools of the carriages is effected through spur gears 60 keyed on the outer ends of the sleeves 34. These spur gears are constantly in mesh with a stationary ring gear 61 carried by the frame structure B and are held in place as by collars 51. The ring gear is preferably mounted as by spacers 62 (Fig. 2) and bolts 63 on arms 64 of a spider structure secured by bolts 65 (Fig. 9) to a collar 66 embracing and secured to the main shaft housing tube 19.

The sleeves 34 driven by the gear 60 during rotation of the main supply wheel C are free to rotate about the shafts 32. On the sleeves 33 are splined axially slidable clutch sleeves 68 (Fig. 12) having flanged ends 69 formed with radial teeth 70 that are engageable with similar teeth 71 formed on confronting end flanges 72 of the drive sleeves 34. The sleeves 33 are also freely rotatable on the carriage shafts 32, the sleeve ends opposite the splined clutch sleeves 68 being formed with drums 73 which surround concentric drive members 74 keyed on the carriage shafts 32 between the sleeves 33 and the carriage hubs 40. The drive members 74 are formed with external cylindrical friction faces engaged by segmental friction shoes 75 disposed in the annular space between the drive members and the surrounding drums 73. The friction members 75 are carried by hollow radial pins 76 slidable in guide openings formed in the drums 73. The friction segments 75 are yieldingly held against the cylindrical friction faces of the drive members 74 by helical coil compression springs 77 housed in the hollow interiors of the pins 76. The compression of the springs 77 is adjusted by screws 78 carried by arches 79 formed in metal bands 80 (Fig. 15) that embrace the sleeve hubs 73 and are secured to the latter.

The radial teeth 70 on the clutch sleeves 68 are moved into and out of engagement with the matching radial teeth 71 on the drive sleeves 34 by yokes 82 (Figs. 4 and 14) which are pivotally supported on pins 83 carried by brackets 84 bolted to the wheel webs 30. The yokes have outer ring portions that loosely embrace the clutch sleeves 68 and are connected to the latter as by diametrically disposed pins 85. Also pivotally carried by the supporting pins 83 are levers or arms 86 which are angularly disposed to the yokes 82 and extend laterally through openings 87 in the arms 26 of the wheel members. Each of the levers or arms 86 is biased as by a helical coil compression spring 88 to swing in a clockwise direction as viewed in Fig. 12. One end of each of the springs 88 is received on a pin in the corresponding arm 86, the other end of the spring being socketed in an adjusting stud 89 threaded in a bracket 90 secured on the outside of the wheel arm 26. A finger 91 on each of the arms 86 bears against the yoke 82 associated therewith to move the latter in unison with the arm 86 under the influence of the spring 88 to shift the clutch sleeve 68 to the left, away from the driving sleeve 34, thus declutching or disconnecting the drive.

In clutching action, to swing the clutch sleeve 68 into engagement with the teeth of the driving sleeve 34, the arm 86 is moved in a counterclockwise direction against the force of the spring 88 by tracks 240 and 250 to be later described.

These tracks engage a roller or wheel 92 carried on the outer end of the lever. This clutch engaging movement of each of the levers 86 actuates the yoke 82 associated therewith through the medium of a helical coil spring 93 compressed between an extension 94 of the lever and a lateral extension 95 on the yoke. These springs are received on pins carried by the lever extensions 94 and are socketed in adjusting studs 96 threaded into the yoke brackets 95. Thus in the clutching action or movement of each of the levers 86 overrunning or excess movement of the lever is permitted by reason of the resilient connection between the lever 86 and the yoke 82. Furthermore, the yielding of one of the springs 93 permits the clutch teeth to slip and relieve the strain on the parts in cases of severe overloads.

In certain instances, as when placing a new or fresh supply roll R on one of the shafts 45 or when removing a take-up spool 43, it is desirable to prevent actuation or rotation of the shafts 32. For this purpose a manual de-clutching lever 100 is mounted on the outer end of each of the wheel arms 26 as by means of a bracket 98 secured by cap screws to the end 38 of the wheel arm. One end of each of the levers 100 constitutes a handle for manual actuation thereof, the other or shorter end being bifurcated to receive a cam roller 99 carried by a bracket extension 101 secured on the outer end of the clutch yoke 82.

The bifurcated end of the lever 100 is formed with a neutral recess or socket 102 and a de-clutching recess or socket 103. When the lever is positioned as shown in the full lines of Fig. 12, the cam roller 99 is aligned with the neutral recess 102 permitting normal operation of the clutch under the influence of the yoke 82 and lever 86. Upon movement of the lever 100 to de-clutching position shown by the broken lines of Fig. 12 the recess or socket 103 is moved into the path of the roller 99 to hold the clutch yoke 82 in the broken line or de-clutched position in which the clutch sleeve 68 is withdrawn from the driving sleeve 34. The recess in the bifurcated end of the lever 100 is formed with an inclined cam face 104 connecting the recesses 102 and 103 so that in movement of the lever from the neutral to the de-clutching position shown the cam surface 104 acts on the roller 99 to shift the yoke and separate the clutch parts in the event that they are engaged. The bracket 98 carries a spring pressed pin 106 (Fig. 14) manually actuated by a knob 105. The lever 100 has recesses to receive the end of the axially movable pin to hold the lever 100 in either the neutral or the de-clutching position.

When the clutch parts 34 and 68 of any of the carriages are engaged, the shaft 32 supporting such carriage is rotated by the drive established through the shoes 75 and the friction members 74. This driving of the shaft 32 turns the take-up spool 43 carried thereby to wind liner material thereon as the liner comes off the bottom feed roller 47. As the amount of liner wound on the take-up spool increases the rotational speed of such spool relative to that of the feed rollers is necessarily reduced. Such variation in rotational speed of the take-up spool is accommodated by slippage in the frictional drive afforded by the spring pressed shoes 75 and the cylindrical member 74.

Chain belts 108 are trained around sprockets 109 secured to the drum ends 73 of the driven sleeves 33 so as to be actuated in unison therewith. The chains 108 are also trained about and drive relatively smaller sprockets 110 keyed on the shafts 50 which carry the upper feed rollers 48 of the web carriages E. Gears 111 and 112 are secured on projecting ends of the feed roller shafts 49 and 50, respectively, these gears being of equal diameter and meshed to turn the shafts and rollers in unison, at the same rotational speed, but in opposite directions. Rotation of the carriage drive sleeves 34 by rotary movement of the wheel assembly C, the sleeve mounted gear 60 being in mesh with the ring gear 61 and the teeth of the clutch sleeves 34 and 68 being engaged operates to drive the feed rollers 47 and 48 to draw the ply webs W and the liners L from the supply rolls R, the sprockets being so proportioned that the linear surface speed of the feed rollers corresponds to the linear surface speed of the take-up spools 43 being turned by the carriage shafts 32. As the liners build up about the take-up spools, the drive members 74 slip against the friction shoes 75 permitting the take-up spools to turn at progressively slower rotational speeds and keep the liners tensioned about the feed rollers.

A metal stabilizing weight 114 is secured to each of the depending carriage arms 46 to prevent turning of the carriage with its supporting shaft 32. A friction drag or adjustable brake is provided for the supply roll shaft 45 to prevent overrunning of the supply roll after a feeding period and to maintain the web and liner taut between the supply roll and the friction feed roller 47. A suitable friction device is shown in Figs. 15 and 16 and comprises a band 115 embracing a cylindrical friction face of a wheel member or drum 116 secured on a projecting end of the shaft 45. The band 115 is formed with lateral ears or lugs adjustably drawn together by a nut and bolt 118 for the purpose of varying the frictional grip of the band on the wheel 116. A pin 117 is carried by the weight 114 to engage the band ears and prevent rotation of the band.

The main carrier or wheel C turns intermittently in a clockwise direction as viewed in Fig. 1, bringing the carriages successively to an operating or service station adjacent drum 120 of the tire builder A. The machine frame B carries a track member 121 formed with a tapering curved channel 122 that receives and guides rollers 123 (Fig. 18) secured on lateral extensions 124 of the depending carriage weights 114. The channel 122 extends over only about one-fourth of the orbital or closed path of the carriages beginning at the lowermost position of each of the carriages and ending as the carriages move away from the service station adjacent the building drum 120. Thus the carriages are substantially free for limited swinging or pivoting movement about the supporting shafts 32 throughout the major portion of their orbital travel. Each carriage, by reason of gravity action, retains a substantially constant orientation with the horizontal which maintains the several festoons of ply material and chafer and breaker strips in uniform relation. At the bottom or receiving end of the channel 122 the latter is flared or widened as indicated at 125 to facilitate the entry of the rollers 123 and to accommodate slight displacement of such rollers by reason of the permissible limited swinging of the carriages.

*Strip guiding and supporting tables*

At the service or supply station the operator draws the ply material and the chafer and breaker strips onto the building drum 120 over the tables or ply boards F previously mentioned. These tables comprise substantially flat plates or members 127 carried by arms 128 of the festoon carriages. Parallel rods 129 and 130 extend cantilever fashion from the carriage arms 128. The rods 129 are rigidly secured in bosses 131 on the carriage arms and the rods 130 are rotatable in the ends of the carriage arms. The outer ends of the rods are connected by links 132 which are secured on the rods 129 and are formed with journals to rotatably receive the rods 130. The table plate members 127 are secured to the rods 130 as by means of bracket elements 133 keyed or welded on the rods 130.

The ends of the rods 130 which project through the carriage arms 128 carry lever arms 134 by means of which the rods may be rotated in their journals to swing the ply boards or plates 127 to any desired positions. This swinging of the ply boards is accomplished by cam elements 135 and 136 secured on an upstanding extension frame member 137 attached to the supporting structure B. The cam element 135 is positioned to present a substantially vertical guide edge to rollers 138 on the ends of the board actuating arms 134 as the festoon carriages E move in succession upwardly to the service or supply station over their arcuate paths. During this movement each of the ply boards F moves or swings substantially from the lower broken line position of Fig. 19 to the full line position of that figure. The ply boards are held in the full line position by engagement of the lever arms 134 against a stop 139 secured to the arm 128 of the carriage. As each carriage moves away from the service station its ply board is swung upwardly by engagement of the cam roller 138 against a curved guiding edge on the upper cam element 136, an intermediate position of such movement being indicated by the upper broken lines of Fig. 19. During subsequent continued movement of the carriage away from the supply or service station, the ply board F is further swung by the cam element 136 to the retracted position illustrated in Figs. 1 and 15 in which the ply board rests against a support 140 secured to the carriage arm.

Ply material webs moving onto the ply boards F are directed by guides 142 that are adjustably supported by arms 143 which extend toward one another from beneath the opposite side edges of the flat support or plate members 127. The guide support arms 143 are formed with lateral extensions 144 welded or otherwise secured to the carriage arms 128 and the connecting links 132. Elongated slots 145 formed longitudinally of the arms 143 accommodate bolts 146 which extend through the guides 142 and retain the latter in adjusted positions along the support arms. The guides 142 are formed of sheet metal bent reversely and also with an acute angle flange 147 to provide confronting V-shaped openings or channels which taper or become narrower in the direction of ply material movement.

The ply boards or tables F are mounted so that their swinging movements to and from the service position are restrained by adjustable friction devices. These devices may each take the form of a knurled hand wheel 148 screwed on the threaded outer end of the supporting shaft 130. Desirably a friction disc 149 and a corrugated spring washer 150 are received on the rod 130 between the hand wheel 148 and the outer face of the supporting link 132. Tightening of the hand wheel against the link 132 increases the resistance to turning of the ply support table so that it moves under the influence and control of the lever 134 and the cams 135 and 136 instead of dropping freely by gravity.

In their movement across the ply boards the several ply material webs W travel between parallel side guides 152 which are secured to slide elements 153 guided for endwise movement across the bottom faces of the ply boards. The slide elements are formed with rack teeth interconnected by gears 154 rotatably mounted in brackets 155 secured to the undersides of the ply board plates 127. The connections between the slide elements 153 and the side guides 152 extend through elongated slots 156 disposed crosswise of the plates 127. The slots 156 permit movement of the side guides 152 toward and away from one another in adjusting the ply boards F to ply material webs W of different widths. The ply material guides 147 and the side guides 152 are customarily adjusted to the same spacing.

Across the receiving end of each of the ply board plates 127 is a pair of parallel rollers 157 and 158. The ends of the rollers receive pins rotatably carried by the brackets 133 previously mentioned. The ply material webs W are guided onto the ply boards over the rollers 157 and pass under the rollers 158, the latter serving to hold the ply material against the faces of the ply boards and to prevent the ply material from becoming displaced from between the side guides 152. Rollers 159 are disposed along discharge edges 160 of the ply board plates 127, these rollers being carried by pins rotatable in bracket elements 161 secured to the table corners. The ply material strips are passed under the rollers 159 so as to be held by the latter against the upper faces of the ply boards. The rollers 159 also cooperate with the rollers 158 in preventing displacement of the ply material from between the side guides 152 when the ply boards are pivoted to the retracted positions referred to. The ply boards remain in the partially inverted retracted positions throughout the major portion of their travel.

*Chafer and breaker strip carriage*

The chafer and breaker strip carriage D is similar to the ply material carriages E, being supported on a shaft 32' at the end of one of the pairs of wheel arms 26 and 27. The shaft 32' for the chafer and breaker carriage D (see Fig. 13) is parallel to the rotational axis of the wheel C as are the corresponding shafts 32 of the ply material carriages and is received in a tubular hub 162 which corresponds to the hubs 40 of the ply material carriages. This hub carries a frame member or plate having an arm 165 for supporting a strip board F' similar to the ply boards F previously described in connection with the ply carriages E. The shaft 32' for the carriage D is journaled in a pair of the drive sleeves 33 and 34 that are driven from the ring gear 61 similarly to the corresponding sleeves of the ply web carriages E. The square sectioned portion 42 is omitted from the shaft 32' of the carriage D, the shaft being terminated adjacent the tubular hub 162 and being formed with a reduced diameter portion 166 that receives a collar 167. The collar is secured as by set screws on the reduced diameter shaft portion to retain the ball bearing assembly 41 and the carriage hub 162 in place on the shaft.

Chafer and breaker strips are assembled in other operations into rolls S and T which comprise continuous strips of chafer stock X and breaker stock Y wrapped about cylindrical spools 170 with separating liner strips M and N. The rolls S and T are mounted on square sectioned sleeves 171 and 172 rotatable on cantilever pins 173 secured in the ends of swingable arms 174. These arms extend laterally from sleeves 175 adjustably mounted on bar or rod 176 keyed in a bore through a boss 177 on the lower end of depending carriage arm 164. The bar or rod 176 is supported at one end cantilever fashion in the carriage arm 164 and the spool receiving sleeves 171 and 172 are cantilever mounted on the swingable arms 174 to facilitate placement and removal of the spools about which the supply rolls S and T are wound.

On one end of each of the sleeves 171 and 172 is a circular drum element 178 having a grooved periphery embraced by a metal friction band 179. The ends of these bands are bent to form lateral ears 180 connected by an adjusting bolt and wing nut 181 by means of which the frictional grip of the bands on the circular members 178 may be adjusted. Pins 182 secured in the arms 174 extend between the ears 180 of the friction bands to prevent rotation of such bands which thus act as frictional restraints on rotation of the square sectioned sleeves 171 and 172 and the supply rolls S and T carried thereby.

Locating collars 184 are secured on the rod 176 as by set screws 185 and engage the ends of the sleeves 175 to locate the sleeves and the arms 174 in desired spaced positions along the length of the rod. A flat face 186 is formed along one side of the otherwise circular sectioned rod 176, and screws 187 having large diameter knurled heads 188 are threaded into the sleeves 175 to engage against the flat rod face 186 to prevent turning of the sleeves on the rod to thereby hold the arms 174 in the desired upstanding positions shown in Figs. 22 and 24. In such positions the arms 174 support the roll mounting sleeves 171 and 172 in axial alignment with one another. For the purpose of removing one of the spools 170 when all of the strip material has been drawn from it, the arm 174 carrying such spool is swung away from its aligned position with the other arms by loosening the clamping screw 187 of such arm so that the corresponding sleeve 175 is free to turn on the supporting rod 176. After replacement of the empty spool by a spool carrying a fresh chafer roll S or breaker roll T, as the case may be, the supporting arm 174 is swung upwardly so that the pin 173 thereof is aligned with the corresponding pins of the other arms 174 and the arm is locked in position by the screw 187.

The chafer and breaker strips X and Y and the liners M and N therefor, are drawn off the rolls S and T by the carriage feed rollers 47 and 48 which are of the same construction and are similarly driven on all of the carriages. As shown in Fig. 13, the sprocket 109 for driving the feed roller actuating chain 108 is secured to a flange on one end of the driven sleeve 33. The friction drive comprising the shoes 75 and the cylindrical member 74 (Fig. 12) for turning each of the shafts 32 of the ply web carriages E is not used in the chafer and breaker strip carriage D for the reason that the shaft 32' is not driven.

Take-up spools 191 for the chafer and breaker liners M and N may be of the same construction as the supply roll spools 170. These take-up spools are carried by swinging arms 193, one for each of the chafer and breaker strips and corresponding to the arms 174 which carry the supply rolls. The arms 193 are carried by a bar or rod 190 secured cantilever fashion in the end of the horizontal carriage arm 163 in parallel relation to the feed rollers 47 and 48. The take-up spool for one of the chafer strips is indicated at 191, it being formed with a square or non-circular axial opening which receives a matching square or non-circular sleeve 192 rotatable on a cantilever pin supported and extending laterally from one of the arms 193. The square sleeves 192 for the take-up spools correspond to the sleeves 171 and 172 for the supply rolls S and T.

The take-up spools 191, or the liners M and N carried thereby, rest by gravity upon and are driven by a canvas covered roller 194 secured on a shaft journaled in the carriage arm member 163. The shaft for the take-up roller 194 may be supported similarly to the feed roller shafts 49 and 50 and has a sprocket 195 secured thereon, this sprocket being driven by a chain 196 trained around and actuated by a sprocket 197 secured on the feed roller shaft 50. The sprockets 195 and 197 are of the same diameter so that the take-up roller 194 is driven at the same rotational speed as the feed rollers 47 and 48. The take-up roller 194 is of the same diameter as the feed rollers so that the peripheral speed of the canvas cover on the take-up roller corresponds to that of the feed roller covers. Thus the liner take-up is at the same linear speed as the chafer and breaker strip feed. The arms 193 carried as by sleeves 198 on the bar or rod 190 are free to move up and down on the rod in accordance with the size of the liner roll wound about the corresponding spool 191. For example, when one of the spools 191 is empty or substantially so, the arm 193 carrying the same is in its lowermost position, represented by the full lines of Fig. 22. After a quantity of liner material has been wrapped about the spool the diameter of the liner roll increases and the arm 193 is raised to a position such as that indicated by the broken lines of the same figure.

The chafer and breaker carriage D, like the ply roll carriages E, has a roller 123 that is received and guided in the tapering channel 122 of the frame as the carriage moves to the service station. The stub shaft 126 for the roller is carried by a lateral extension 200 on a member 201 secured to the depending arm 164 of the chafer and breaker strip carriage.

A work table or strip board F' similar to the ply boards F described in connection with the ply material carriages D is cantilever mounted on portion 165 of the chafer and breaker strip carriage frame. The fabric guides 147 and 152 may be omitted from the work table F', the other parts of the structure being the same as previously described and numbered accordingly.

*Carriage wheel driving and indexing mechanisms*

The star wheel C carrying the carriages D and E in Ferris wheel fashion, can be rotated in any suitable manner for bringing the carriages sequentially to the service station adjacent the drum 120 of the tire builder A. This movement is necessarily intermittent since each carriage dwells at the service station for a period of time during which the operator draws the strip material over the work table or board F or F' in assembling a tire band on the drum 120. Furthermore, since the strip material webs W, X and Y hang in festoons from the several carriages and are fed into the festoons during the movement of the carriages about the ring gear 61, it is desirable and advantageous to start and stop the movement of the carriage wheel C so as to obtain gradual and progressive acceleration and deceleration. The present invention incorporates a modified type of crank and slot or Geneva drive which obtains numerous benefits in the way of positive movement and simplicity as well as the gradual or progressive acceleration and deceleration referred to. In this drive, intermittent rotary movement is imparted to the main shaft 20 through the star wheel 25 which has radial arms 202 corresponding in number to the carriages D and E that are mounted on the wheel C.

Figure 10:
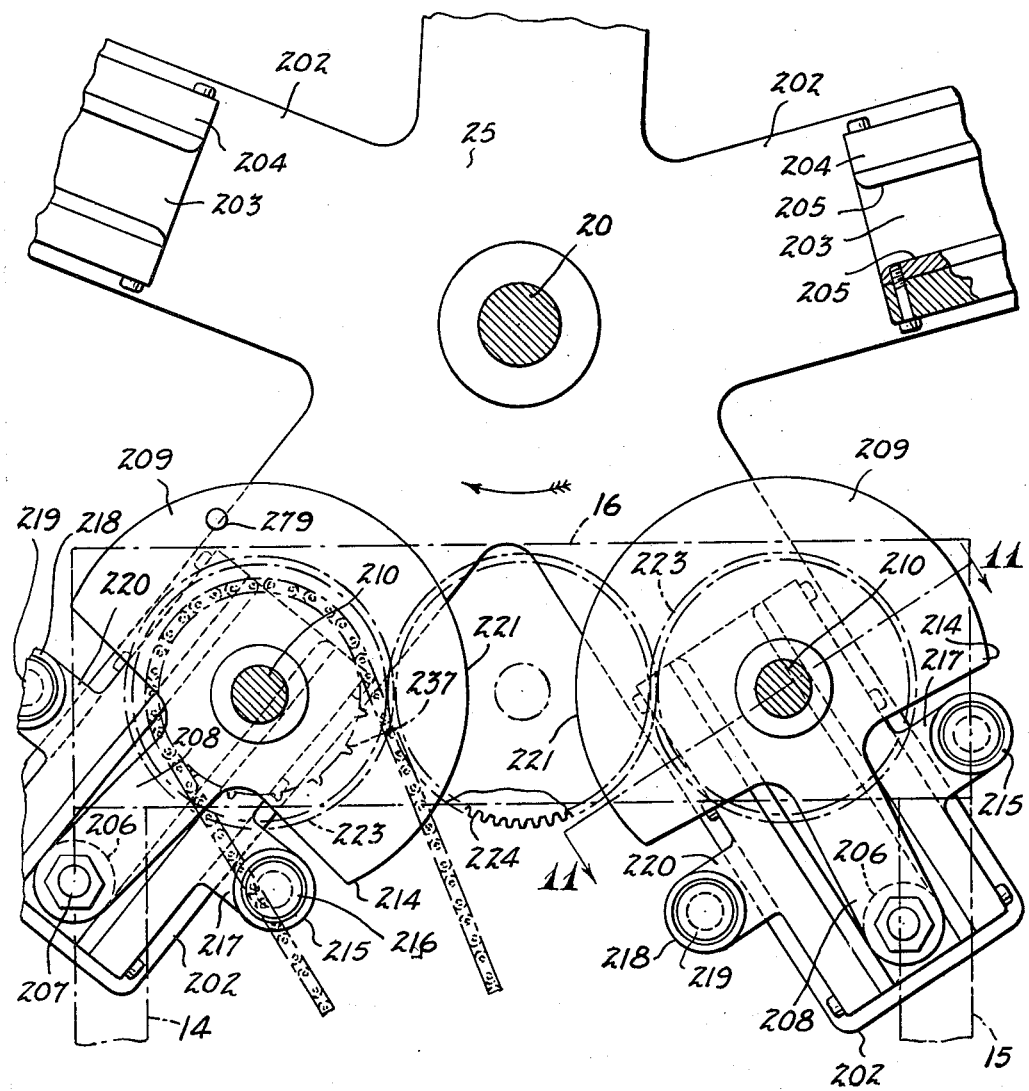
Fig. 10 is a transverse sectional view through the main wheel supporting shaft, parts being broken away and removed and other parts being shown partly in section, this view being taken substantially along the line indicated at 10—10 of Fig. 2 and enlarged with respect to that figure.
Figure 11:
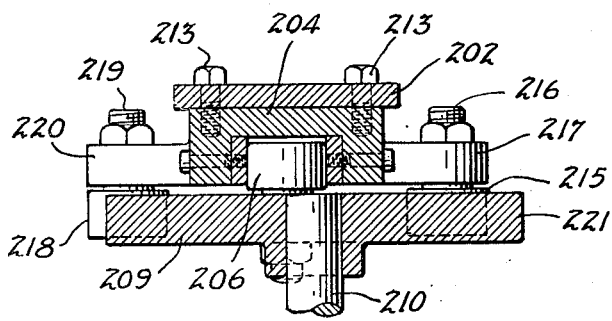
Fig. 11 is a fragmentary sectional detail taken substantially along the line indicated at 11—11 of Fig. 10.

On the outer ends of the arms 202 are radial channels or guideways 203 formed in elongated U-sectioned members 204 secured to the arms by cap screws 213 (Fig. 11). The channel faces are formed by replaceable liners 205 that provide bearing surfaces for rollers 206 carried by paddle shaped rotary drive members operating synchronously and in unison. The paddle drive members each comprises an arm or crank 208 integrally formed on a segmental cam portion 209. The rollers 206 are mounted on stub shafts 207 secured in the ends of the arms 208 and the rotary drive members are secured on a pair of spaced parallel shafts 210 journaled in bearings 211 carried by the upper channel cross members 16 of the supporting structure B. The actuating arms 208 and the segmental cams 209 are mounted to turn in a common plane (clockwise as viewed in Figs. 3 and 10) so that the rollers 206 on the two arms are simultaneously engaged in the channels 203 of adjacent arms of the drive wheel 25. Fig. 10 shows the drive mechanism in an intermediate position approximately midway between dwell positions.

As the rollers 206 ride out of the inner ends of the channels 203 at the completion of a carriage advancing movement of the drive wheel 25 and the carriage wheel C, leading corners 214 of the segmental cams 209 engage rollers 215 rotatably mounted on stub shafts 216 secured in ears 217 projecting from the rear sides of the wheel arms 202. At approximately the same time that the cams 209 engage the rollers 215 on the trailing sides of the arms, other rollers 218 carried by stub shafts 219 secured in ears 220 projecting from the leading sides of the drive wheel arms 202 engage against circular peripheries 221 of the segmental cams so that the drive wheel movement and likewise the carriage wheel movement is positively arrested thereby and the carriage wheel stops in a precisely determined position.

During that portion of the rotation of each of the shafts 210 that carries the rollers 206 from the inner end of one channel to the inner end of the channel on the next following arm of the drive wheel 20, the drive wheel and the carriage wheel C remain stationary, being held in desired position and locked against rotation by engagement of the rollers 215 and 218 against the circular peripheries 221 of the circular cams 209 (see Fig. 3). During this swinging movement of the arms 208 the cam peripheries 221 ride against the rollers 215 and 218, the latter rolling along the circular edge faces of the cams.

The shafts 210 have gears 223 secured thereon between the channel frame members 16, these gears being connected by an intermediate gear 224 so that the two shafts rotate simultaneously in the same direction and at the same rate of speed. These shafts are driven by an electric motor 225 which drives a speed reducer 226 by means of a belt 227 and pulleys 228 and 229, the pulleys being secured on the motor and speed reducing shafts respectively. A horizontal plate 230 secured across the lower part of the supporting structure B mounts the motor and speed reducer, the output shaft of the latter having a sprocket 231 secured thereon to actuate an endless chain belt 232 which drives a sprocket 233 on an intermediate or jack shaft 234. A smaller sprocket 235 secured on the jack shaft 234 drives a chain 236 trained about a sprocket 237 secured on one of the shafts 210, thereby effecting a positive driving connection between the motor 225 and the actuating shafts 210.

*Festoon control*

As described in connection with the ply web carriages D, the ply, chafer and breaker strips W, X and Y are fed into their respective festoons during the carriage wheel movement by action of the gears 60 traveling about the fixed ring gear 61. The lengths of the several strips that are withdrawn for use by the operator in the building of successive tires are subject to unavoidable variations and it has been found unsatisfactory to predetermine the feeding of the several strip materials or to feed fixed amounts of the strip materials into the festoons during each cycle. A principal feature of the present invention is the provision of a strip feeding control which is arranged to maintain a festoon length between predetermined limits so that as each carriage is moved to the service station a sufficient length of strip material, preferably a slight excess, is immediately available for use by the operator. Control of the strip feed to obtain a desired festoon length is effected by the combination of a constant feed period and a variable feed period. In the present apparatus the variable feed period precedes the predetermined or fixed feed period although it is feasible to reverse the arrangement so that the predetermined or fixed feed period precedes the variable feed period or, if desired, both periods may be combined in a single feed period the length or duration of which is controlled in accordance with the principles herein disclosed.

As previously explained, the driving of the feed rollers 47 and 48 is effected through the clutches comprising the sleeves 34 and 68 carried by the carriage shafts 32. When the teeth 70 and 71 of these clutch sleeves are engaged, the rotation of the carriage wheel C moves the corresponding gears 60 about the ring gear 61 to rotate the feed rollers 47 and 48 so as to draw the strip material from the appropriate supply roll and feed it into the festoon.

The clutch parts are normally disengaged by reason of the action of the compression springs 88 acting on the arms 86 and through the latter on the yokes 82 to hold the clutch sleeves 68 in retracted positions. As each pair of carriage wheel arms 26 and 27 commence their movement across the lower half of each revolution (from right to left as viewed in Figs. 1 and 4) the roller 92 on the clutch actuating lever 86 carried by such pair of wheel arms, rides onto an arcuate cam track 240. This cam track is concentric to the rotational axis of the main shaft 20 and is formed with an outwardly curved initial or starting end portion 241 which serves as a ramp to facilitate the movement of the clutch lever rollers 92 onto the arcuate inner surface of the track. The cam track is bodily shiftable in a radial direction with respect to the rotational axis of the carriage wheel so as to be movable into and out of the path of the clutch lever rollers 92. An angularly disposed body portion 242 is formed integrally along the central portion of the cam track, this body portion being secured to and carried by a radial rib 243 slidable longitudinally in a channel formed in a guide member 244 secured to the frame structure B. A pneumatic cylinder assembly 245 is secured to the frame structure and includes an axially reciprocable piston actuated rod 246 secured to flange 247 on the cam track body 242. The pneumatic cylinder assembly 245 is of the double acting type, air under pressure normally being maintained in the upper end of the cylinder, as viewed in Fig. 4, so as to hold the rod 246 extended from the cylinder. Thus extended the piston rod holds the cam track 240 in its outermost position illustrated in Fig. 4, the cam track being beyond the path of the clutch rollers 92.

Admission of air or other pneumatic fluid into the lower end of the cylinder assembly 245 acts to retract the piston rod 246 into the cylinder and draw the cam track 240 radially inward to the broken line position shown in Fig. 4 so as to engage one of the cam rollers 92 and cause the corresponding yoke 82 to shift the clutch sleeve 68 into engaged or driving relation with the clutch sleeve 34 (Fig. 12).

The fixed or predetermined strip feeding period which follows the variable feeding period controlled by the track 240 is controlled by a stationary cam track 250 curved concentrically to the rotational axis of the main shaft 20 and formed with outwardly flared or curved portions or ramps 251 and 252 at the initial and terminal ends respectively. An integral flange 253 extends radially outwardly along one edge of the cam track 250 and is bolted to the face of the ring gear 61 to support the cam track in such position that each clutch lever roller 92, in riding onto the cam track, actuates the clutch associated therewith, to effect the driving connection which feeds a predetermined length of strip material into the festoon suspended from the carriage as the latter moves to the service station.

Adjacent the terminal end 252 of the fixed cam track, a cam or throw-out 254 is secured to an arm 255 carried by the frame structure B. The cam 254 has a curved face 256 positioned to engage the clutch lever 86 and move the latter outward to declutching position as the roller 92 is released by the terminal end 252 of the cam track 250. The cam 254 thus functions to provide positive clutch release to insure stoppage of the feed rolls 47 and 48 after the fixed feed period.

*Control*

An operator building a tire band on the drum 120 governs the indexing drive mechanism for the servicer by a start button 260 in a box 261 carried by the upright frame extension 137. The electrical wiring or control circuit and components associated with the switch 260 are shown diagrammatically in Fig. 25 wherein diagrammatic representation of structural elements and components previously described are indicated by the same numerals of reference.

Pushing the start switch button 260 closes a normally open spring biased switch that energizes an electro-magnetic holding coil or solenoid 262 of motor control relay 263. The switch controlled by the button 260 is series connected in a circuit through a normally closed spring biased switch governed by emergency stop button 272, a normally closed limit switch 271 and the solenoid 262, wires 273, 274, and 275 connecting these components in series between supply wires or conductors L-1 and L-2 of a three-phase electrical power source. Energization of the solenoid 262 actuates relay armature 264 to close contacts 265, 266 and 267 that connect the drive motor 225 to three-phase power source conductors L-1, L-2 and L-3 through wires 268, 269 and 270. The relay armature also carries a holding contact 277 which maintains energization of the relay solenoid 262 through the limit switch 271 and the emergency stop switch 272, a wire 278 extending from the holding contact to the emergency stop switch.

Energization of the motor 225 in the manner described operates through the belt 227, speed reducer 226 and related drive elements to turn the main shaft 20 and shift the carriage C through one-fifth of a revolution, this indexing movement serving to withdraw upwardly and obliquely away one of the carriages D or E from the service station adjacent the tire building drum 120 and to bring the next succeeding carriage upwardly and obliquely into servicing position. Each such indexing movement of the main wheel C is effected by a single rotation in unison of the two levered cam members 209, these cam members moving simultaneously and synchronously to cooperate in the wheel shifting action. The use of a pair of wheel shifting lever-cams in this manner provides a smooth and positive operating mechanism since backlash is eliminated and wear compensation can be made by simple adjustment of the relative positions of the lever arms on the two drive cams.

A particularly advantageous feature of the rotary cam drive is the variable rate of the rotary motion imparted to the main wheel C. As shown in Fig. 3, which represents one of the stationary or dwell positions of the rotary carriage wheel, the drive rollers 206 of the rotary cam assemblies enter the guide channels 203 when such channels or their substantially radial walls or surfaces are substantially tangential with respect to the circular paths of the rollers. Movement of the main wheel is thus initiated while the mechanical advantage of the levers of the rotary cam drive is at a maximum. The start of each shifting movement of the main wheel is gradual—abrupt and jerking motions are avoided. Similarly, as each shifting movement of the main wheel is being concluded, the cam rollers 206 are approaching portions of their paths with respect to which the channels 203 are tangentially disposed and gradual deceleration of the main carriage wheel C occurs. The gradual acceleration and deceleration of the main wheel C avoids objectionable swinging of the festoons of the ply material webs W and the chafer and breaker strips X and Y. Excessive swinging or displacement of these webs or strips from their normal festoon positions is objectionable because their inherent tackiness tends to cause them to adhere to one another should they come in contact or to become fouled on the components of the machine.

As a further feature of the main wheel drive, the relationships and connections between the levers carrying the cam rollers 206 and the radial channels 203 are arranged to provide a substantially uniform rate of wheel rotation and web drive during the major portion or period of each indexing movement. As the cam rollers 206 move radially outward along the channels 203, the moment arms of the rollers about the rotational axis of the main shaft 20 progressively increase until the rollers are in the outermost portions of the channels, as shown in Fig. 10. During movement of the cam rollers from the inner ends of the channels to the outer ends thereof and then back again, during which movement the moment arms of the cam rollers 206 about the main shaft progressively increase and decrease, the angular velocity of the cam rollers about the main shaft 20 likewise increases and decreases so that a compensating effect is obtained that imparts a more constant or uniform rotational speed to the main carriage wheel C during the major portion of each shifting movement.

As the cams 209 complete each wheel indexing movement, a pin 279 (Fig. 3) on one of the cams moves against the roller of the limit switch 271, opening the latter and breaking the circuit through the solenoid 262 of the motor relay 263. The armature 264 of the relay is spring loaded so that upon de-energization of the solenoid 262 the contacts 265, 266 and 267 are opened and the main drive motor 225 is de-energized. The movement of the relay armature also opens the holding contact 277 so that subsequent closing of the spring loaded limit switch 271 after release by the pin 279 is ineffective to then re-actuate the motor relay.

When the cam rollers 206 ride out of the channels 203 after each wheel indexing movement the rollers 215 and 218 on the arms 202 of the star wheel 25 are engaged against the circular peripheries 221 of the cam members 209 (Fig. 3) to lock the star wheel and the main carriage wheel C against rotary movement, thereby holding one of the carriages at the service station adjacent the tire building drum 120.

Immediately after the commencement of each indexing movement of the main wheel C, a roller 281 on the actuating arm of a normally open spring biased limit switch 280 is engaged by the collar 51 on one of the carriage shafts 32 to close the limit switch momentarily and energize solenoid or electro-magnetic armature coil 282 of the relay 283. The limit switch 280 is connected in series between power supply conductor or line L–1 and one of the terminals of the solenoid 282 by means of a wire 284. The other terminal of the solenoid is connected by wire 285 to contactor 286 of a relay unit 287 controlled by a photo-electric cell 288. The photo-cell and relay unit combination is conventional and is only diagrammatically represented in the drawings. The relay contactor 286 is connected to power supply conductor or line L–2 for energizing the solenoid 282 of the relay. Spring biased, normally open armature 289 of the relay 283 carries contacts 290 and 291, the former, when closed, connecting the solenoid coil 282 to the power supply conductor L–1 to maintain energization of the relay solenoid after opening of the limit switch 280. The contact 291 of the relay 283 connects the power supply conductor L–1 to actuating solenoid coil 293 of electro-magnetic valve 294 through a wire 295. The other terminal of the valve solenoid 293 is connected to power supply conductor L–2.

The valve 294 is a four way fluid control valve which receives air or other pneumatic fluid under pressure from a suitable source of supply (not shown) through a pipe or conduit 296. When the solenoid valve is in its normal condition, not energized, the spring loaded valve body is arranged to connect the supply conduit 296 to the upper end of the cylinder assembly 245 through conduit or pipe 298 so that the piston rod 246 is extended and the cam track 240 is held in its normally withdrawn position illustrated by the full lines of Fig. 8. Energization of the solenoid 293 of the four-way valve 294 shifts the valve body in the latter to connect the high pressure supply conduit 296 to the lower end of the cylinder assembly 245 through a conduit 299, air from the upper end of the cylinder assembly exhausting back to the valve 294 through the conduit 298 for discharge to the atmosphere through an outlet or exhaust 300. The introduction of high pressure air into the lower end of the cylinder assembly in this manner retracts the rod 246 and shifts the cam track 240 to operative position shown by the broken lines of Fig. 8. In this retracted or operating position the cam track engages the rollers 92 on one of the clutch actuating arms 86 as the rotation of the wheel C moves such arm along the length of the cam track. The pair of toothed clutch sleeves 69 and 72 of the corresponding clutch assembly are thus meshed together and thereby drive the feed rolls of the carriage to feed the web or strip into the festoon depending from the carriage.

Figure 2:
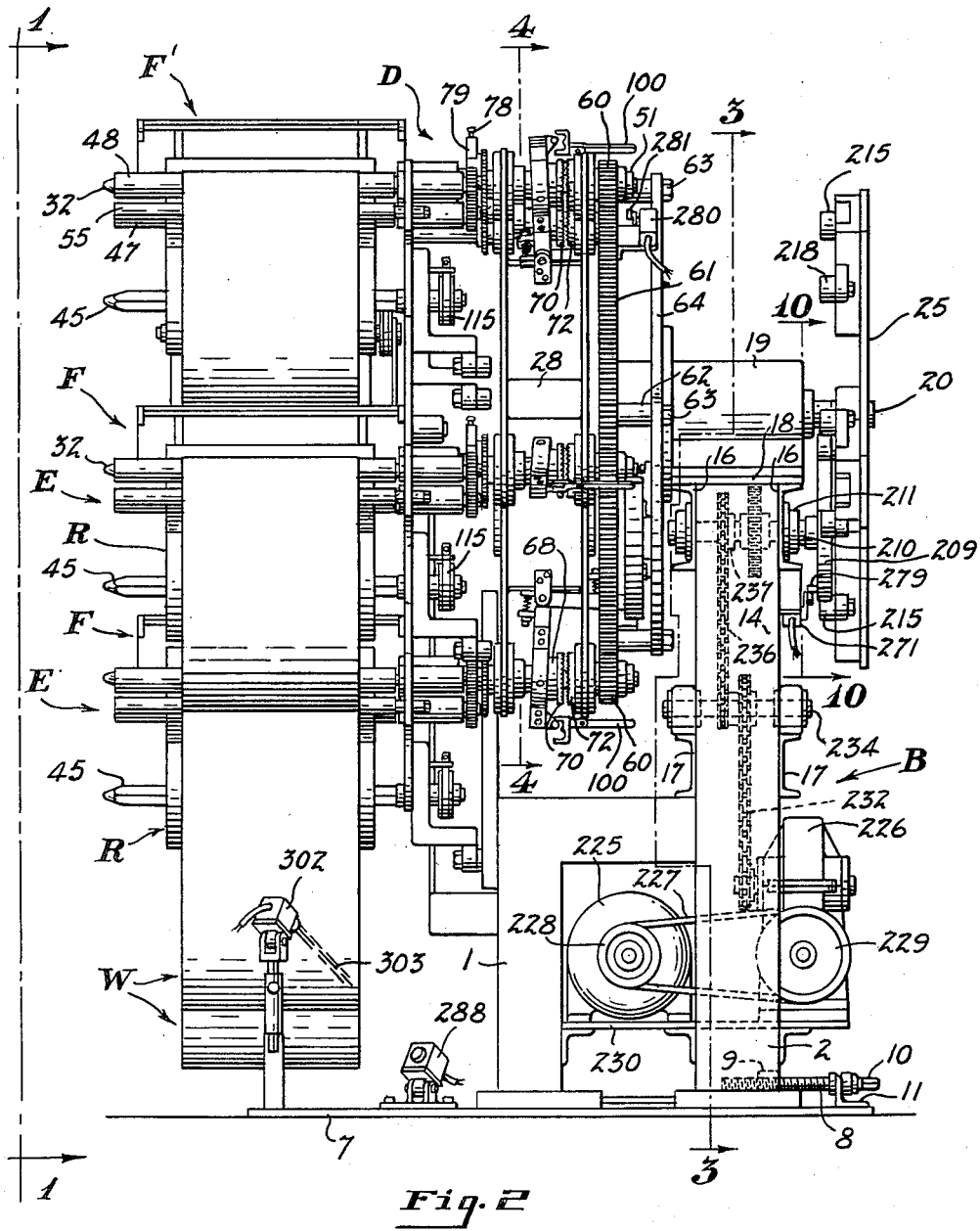
Fig. 2 is a rear elevational view of the servicer apparatus of Fig. 1, the tire building machine being omitted in this view.

During continued movement of the main wheel C, driving the clutch connected strip feeding rolls 47 and 48, the length of the corresponding strip or web festoon progressively increases until the lower end of the festoon moves across the path of light (indicated at 303) from a lamp projector 302 focused on the photo-electric cell assembly 288 (Figs. 1 and 2). Interruption of the beam of light which normally stimulates the photoelectric cell 288 results in opening of the light controlled contact 286 of the relay 287 and de-energization of the solenoid coil 282 of the relay 283. The spring loaded armature 289 of the last mentioned relay opens the holding contact 290 and the valve energizing contact 291 so that the valve solenoid 293 is deenergized and the valve body shifts under spring action to connect the high pressure pneumatic supply line 296 to the upper end of the pneumatic cylinder assembly 245. The cylinder assembly, exhausting through the conduit 299 and the valve outlet 300 forces the piston rod 246 to its outermost position and shifts the cam track 240 to its normal or retracted position. Movement of the cam track 240 to its normal or outer position releases the clutch actuating arm 86 of the carriage moving along the track. The arm swings under the influence of the compression spring 88 and acts against the yoke finger 91 to immediately disengage the teeth 70 and 71 of the clutch sleeves to thereby stop the feed roll drive.

Action of the movable cam track 240 in starting the feed roll drive in response to carriage wheel movement and in stopping the feed roll drive in response to festoon length is operative for each of the carriages on the wheel C. Thus, as each carriage is moved to its lowermost position in its orbital path about the main shaft 20, the festoon depending therefrom is fed to a predetermined length in a primary or variable feeding period. The lowermost carriage in Fig. 1 has just completed a primary web feeding movement and is stationary, the rotative movement of the wheel C having been stopped by engagement of the rollers 215 and 218 against the rotary cam members 209. The same figure shows the preceding carriage disposed at the service station adjacent the tire building drum 120 of the builder A and held against swaying by its roller 123 held in the cam groove 122.

During the movement of each carriage from its lowermost position to the outfeed position at the service station, this movement being equivalent to one of the indexing movements of the main wheel, the festoon depending from such carriage is lengthened in a secondary feeding period by a predetermined amount which is substantially the same for each of the carriages. This additional or supplemental feeding of the strips or ply material into the festoons occurs during that movement of each carriage which follows the primary feeding movement and is effected by a stationary cam track 250 which successively and sequentially engages the cam roller 92 on each of the several clutch actuating arms to establish driving connections between the stationary ring gear 60 and the different pairs of feed rollers 47 and 48 during the travel of each carriage upwardly toward the service station.

The festoon depending from each carriage advanced to the service station is substantially of a predetermined length and contains a substantially constant predetermined amount or quantity of ply material, or chafer and breaker strips, as the case may be. This constant length of strip material or stock is maintained at the service station position of each carriage regardless of the amount of the stock or strip material withdrawn from the festoon by the operator on the previous cycle. Compensation for greater or lesser amounts withdrawn is obtained by reason of the variable primary feeding period through the use of the control relay assembly 287 responsive to the photocell 288.

Each complete rotation or cycle of the main carrier or wheel C is effected by a sequence of separate indexing movements corresponding in number to the number of carriages to be brought to the service station. During each indexing movement one of the descending carriages goes through the variable primary web feeding operation and one of the ascending carriages goes through the fixed or predetermined web feeding operation. Thus a plurality of the carriages are feeding the strip or ply materials into their festoons during each of the intermittent indexing movements of the main wheel while the remaining carriages are merely shifted between different circumferential positions without altering their festoon lengths. Furthermore, although each carriage goes through a plurality of intermittent web feeding stages immediately prior to being locked in work position at the service station, the carriages all pass through a sequential series of indexing movements during which their web feeding mechanisms or rolls are inactive. This feature facilitates reloading as will later appear.

As each carriage moves to web delivery position at the service station, the ply supporting board or table F is swung by cam 135 outwardly from the retracted position occuped during the major portion of the travel of the carriage orbitally about the main shaft 20 to the extended or work position shown in Fig. 1 and by the full lines of Fig. 19. In this extended position ply or strip material from the festoon extends under the rollers 158 and 159, being folded back upon itself about the rod 158 in convenient position to be grasped by the operator, drawn out if necessary, and laid on top of the drum 120. The ply material or strip web thus placed on the tire building drum is adhered thereto in the usual manner and the building drum is rotated slowly by power to draw the ply material out of the festoon over the platform member 127 of the table. The operator stops the rotation of the tire building drum when the desired length of ply material has been drawn thereon. The ply material or strip web is parted as by tearing the same at the desired location. The ends of the web wrapped about the drum 120 are overlapped and adhered or stitched together and the projecting end of the unused ply material strip extending from the ply supporting table or platform F is folded back upon itself about the table roller 159. As the carriage moves away from the strip withdrawal or service station the platform or ply table F is swung to retracted position against the support 140 by the action of the curved edge of the cam 136 acting on the roller 138 on the table operating arm 134.

While one operator assembles tires on the builder A, another operator replenishes the supply rolls R, S and T as the carriages move intermittently downwardly at the rear of the machine. The replenishment of the ply material rolls R is readily accomplished since the cantilever arrangement of the square shafts 42 which carry the take-up spools 43 and the square shafts 45 upon which are mounted the core spools 44 permit such spools to be quickly and easily withdrawn and replaced axially. In such operation the full take-up spool 43 carrying the liner L is withdrawn from the driven take-up shaft 42, the empty core spool is withdrawn from the supporting shaft 45 and placed on the take-up shaft 42, and a fresh roll R of interleaved liner and ply material web carried by a new core spool 44 is slid onto the cantilever supporting shaft 45. The threading of the ply material web and liner about and between the feed rolls 47 and 48 and over the guide roll 55 is quickly accomplished by reason of the cantilever arrangement of each of these rolls. Similar procedures are followed in replenishing the chafer and breaker strip rolls S and T when the latter are exhausted. In the case of the chafer and breaker strip rolls, however, it is necessary to swing the appropriate cantilever shaft 171 or 172 out of alignment with the others by loosening the corresponding handwheel 188 so that the spent spool 170 can be axially withdrawn from the square shaft. Likewise, the appropriate arm 193 carrying the take-up spool on the friction drive roller 194 must be swung away from the latter to enable the spools being withdrawn and replaced to clear the other spools on the friction roller.

In accordance with the patent statutes the principles of the present invention may be utilized in various ways, numerous modifications and alterations being contemplated, substitution of parts and changes in construction being resorted to as desired, it being understood that the apparatus shown in the drawings and described above is given merely for purposes of explanation and illustration without intending to limit the scope of the claims to the specific details disclosed.

What we claim and desire to secure by Letters Patent of the United States is:

1. Servicing apparatus for storing a stock of flexible strip material and supplying the same to an operating station as required, said apparatus comprising a supporting structure, a ferris wheel type carrier rotatably mounted on the structure, a plurality of pivotally suspended stock carriages mounted on the carrier for swinging movements about axes substantially equidistant from the rotational axis of the carrier, stock and liner rolls rotatably mounted in spaced relation on each of the carriages, power actuated means carried by the structure and having driving connection with the carrier for imparting intermittent rotating movement to the carrier to move the carriages sequentially to an operating service station, and means coacting between the supporting structure and the carriages to prevent swinging movement of the latter at said station.

2. Servicing apparatus for storing a stock of flexible strip material and supplying the same to an operating service station as required, said apparatus comprising a supporting structure, a carrier mounted on the structure for rotation about a substantially horizontal axis, a plurality of carriages rotatably mounted on the carrier, stock feed rolls on the carriages, a cam and follower drive for imparting predetermined intermittent rotation to the carrier through predetermined angles to move the carriages sequentially to an operating service station, and drive means actuated by relative movement between the carrier and the supporting structure operative automatically to actuate the stock feed rolls in response to movement of the carriages.

3. Servicing apparatus for storing a stock of flexible strip material and supplying the same to an operating service station as required, said apparatus comprising a supporting structure, a movable carrier on the structure, a stock feed roll and means rotatably mounting the roll on the carrier, a rack on the supporting structure, a gear movable with the carrier and meshed with the rack, means including a clutch connecting the gear and the stock feed roll for rotating the latter during carrier movement, and means responsive to carrier movement for governing the clutch.

4. Servicing apparatus for storing a stock of flexible strip material and supplying the same to an operating service station as required, said apparatus comprising a supporting structure, a rotatable carrier on the structure, a plurality of carriages rotatably mounted on the carrier, stock feed rolls rotatably mounted on the carriages, a circular gear rack on the supporting structure in substantially concentric relation to the rotational axis of the carrier, gears rotatably mounted on the carrier in meshed relation to the gear rack, means including a clutch connecting each of the stock feed rolls to one of the gears for actuation of the stock feed rolls during carrier rotation, and control means responsive to carrier movement governing the clutches.

5. Servicing apparatus for storing a stock of flexible strip material and supplying the same to an operating service station as required, said apparatus comprising a supporting structure, a rotatable carrier on the structure, a plurality of carriages rotatably mounted on the carrier, stock feed rolls rotatably mounted on the carriages, a circular gear rack on the supporting structure in substantially concentric relation to the rotational axis of the carrier, gears rotatably mounted on the carrier in meshed relation to the gear rack, means including clutches connecting the stock feed rolls to the gears for rotation of the stock rolls during carrier rotation, cam means on the supporting structure, and control means associated with each of the clutches engageable with the cam means individually to govern the operation of the several clutches in response to carrier movement.

6. Servicing apparatus for storing a stock of flexible strip material and supplying the same to an operating service station as required, said apparatus comprising a supporting structure, a movable carrier on the structure, a plurality of carriages each movably mounted on the carrier, stock rolls and means rotatably mounting the rolls on the carriages, stock guiding tables on the carriages, each table being pivotally mounted for shifting movement between a retracted carrier shifting position and an advancing stock guiding position, and means coacting between the supporting structure and the individual stock tables for shifting the latter between retracted and advanced positions in response to carrier movement.

7. Servicing apparatus for storing a stock of flexible strip material and supplying the same to an operating service station as required, said apparatus comprising a supporting structure, a carrier movable on the structure, a plurality of carriages rotatably mounted on the carrier, stock rolls on the carriages, stock guiding tables pivotally mounted on the carriages for tilting movement about axes paralleling the rotational axes of the carriages, and means on the supporting structure coacting with the stock tables to tilt the latter between retracted carrier shifting positions and advanced stock guiding positions in response to carrier movement.

8. Servicing apparatus for storing a stock of flexible strip material and supplying the same to an operating service station as required, said apparatus comprising a supporting structure, a carrier movable on the structure, a plurality of carriages mounted on the carrier for rotation about parallel substantially horizontal axes, stock guiding tables pivotally mounted on the carriages for tilting movement about axes paralleling the rotational axes of the carriages, and means on the supporting structure coacting with the stock tables to tilt the latter sequentially between retracted carrier shifting positions and advanced stock guiding positions in response to carrier movement.

9. Servicing apparatus for storing a stock of flexible strip material and supplying the same to an operating service station as required, said apparatus comprising a supporting structure, a movable carrier on the structure, a plurality of carriages movably mounted on the carrier, means for imparting intermittent movement to the carrier to bring the carriages sequentially to an operating station, stock rolls and stock tables on the carriages for respectively storing stock and guiding stock from the rolls at the service station, said tables being individually shiftable on the carriages, and means coacting between the supporting structure and the individual stock tables for shifting the latter in response to carrier movement between a retracted position and an advanced stock guiding position.

10. Servicing apparatus for storing a stock of flexible strip material and supplying the same to an operating service station as required, said apparatus comprising a supporting structure, a movable carrier on the structure, a plurality of carriages mounted on the carrier for sequential movement over a closed path to and from an operating station, stock feed rolls on the carriages, means on each carriage providing a take-off station spaced from the feed rolls of such carriage so that stock can be suspended in a depending festoon on each carriage between the feed rolls and the associated take-off station, means actuated by relative movement between the carrier and the structure for actuating the feed rolls, and control means governing the actuating means to limit the length of each festoon.

11. Servicing apparatus for storing a stock of flexible strip material and supplying the same to an operating service station as required, said apparatus comprising a supporting structure, a movable carrier on the structure, a plurality of carriages mounted on the carrier for sequential movement over a closed path to and from an operating station, stock feed rolls on the carriages, means on each carriage providing a take-off station so that stock can be suspended in a depending festoon between each feed roll and the associated take-off station, means actuated by relative movement between the carrier and the structure for actuating the feed rolls, and control means governing the actuating means, said control means being arranged to initiate stock feed in response to carriage movement and to terminate stock feed in response to festoon length.

12. Servicing apparatus for storing a stock of flexible strip material and supplying the same to an operating service station as required, said apparatus comprising a supporting structure, a movable carrier on the structure, a plurality of carriages mounted on the carrier for sequential movement over a closed path to and from an operating station, stock feed rolls on the carriages, means on each carriage providing a take-off station so that stock can be suspended in a depending festoon between each roll and the associated take-off station, means for individually driving each of the stock feed rolls, said drive means including a clutch and electrically operable means for actuating the clutch, and a light source and photocell combination responsive to festoon length for governing the clutch actuating means to operate the several roll feeds individualy in response to their respective festoon lengths.

13. Stock storing and feeding apparatus of the type having a plurality of carriages and common means mounting the carriages for movement sequentially to and from an operating station characterized in that the carriage mounting means comprises a rotatable wheel structure having a plurality of similar cam surfaces arranged in generally symmetric radiating relation about the rotational axis of the wheel structure and the wheel structure has associated drive means that includes a pair of rotatable lever arms and means for actuating the arms in unison, the arms each having elements movable in circular paths and engageable cyclically against the cam surfaces to shift the wheel, and the elements being arranged during each cycle to engage the cam surfaces initially relatively close to the rotational axis of the wheel, to then move along the cam surfaces away from said axis, and to finally move along the cam surfaces toward said axis whereby the wheel structure is gradually accelerated during the starting of each cycle and gradually decelerated during the ending of each cycle.

14. Stock storing and feeding apparatus of the type having a plurality of carriages and common means mounting the carriages for movement sequentially to and from an operating station characterized in that the carriage mounting means comprises a rotatable wheel structure having a plurality of similar cam surfaces arranged in generally symmetric radiating relation about the rotational axis of the wheel structure and the wheel structure has associated drive means that includes a rotatable lever arm and means for actuating the arm, the arm having an element movable in a circular path and engageable cyclically against the cam surfaces to shift the wheel, and the element being arranged during each cycle to engage one of the cam surfaces initially relatively close to the rotational axis of the wheel, to then move along the engaged cam surface away from said axis, and to finally move along the engaged cam surface toward said axis.

15. In combination in a servicer for supplying strip material to a tire building machine, a supporting structure, a carrier, means movably mounting the carrier on the structure, a plurality of carriages mounted on the carrier in spaced relation to one another for individual swinging movement about separate axes, feed rollers mounted on the carriages for rotation about axes spaced from the respective swing axes, and drive means for actuating the feed rollers in response to carrier movement, said drive means including rotatable elements coaxial to the swing axes of the carriages.

16. In combination in a servicer for supplying strip material to a tire building machine, a supporting structure, a carrier, means movably mounting the carrier on the structure, a plurality of carriages mounted on the carrier in spaced relation to one another for individual swinging movement about separate axes, members on each carriage for supporting supply and take-up rolls, said members being mounted cantilever fashion for rotation about spaced substantially parallel axes thereby presenting free ends on such members for facile removal and replacement of rolls, feed rollers mounted on the carriages for rotation about axes spaced from the respective swing axes, drive means including rotatable elements coaxial to the swing axes of the carriages for actuating the feed rollers during carrier movement, and means for shifting the carrier to move the carriages sequentially to a common station.

17. In combination in a servicer for supplying strip material to a tire building machine, a supporting structure, a carrier, means movably mounting the carrier on the structure, a plurality of carriages mounted on the carrier in spaced relation to one another for individual swinging movement about separate axes, members on each carriage for supporting supply and take-up rolls, a feed roller on each carriage for frictionally engaging strip material from a supported supply roll, said members and feed roller being mounted cantilever fashion for rotation about spaced, generally parallel axes thereby presenting free ends on such members and feed roller for facile removal and replacement of rolls and strip material, drive means for actuating the take-up roll support members and the feed roller of each carriage during carrier movement, said drive means including a rotatable element coaxial to the swing axis of the carriage with which it is associated, and means for shifting the carrier to move the carriages sequentially to a common station.

18. In combination in a servicer for supplying strip material to a tire building machine, a supporting structure, a rotatable carrier comprising spaced members secured together and mounted on the structure for rotation in unison, a rod journaled in the members and having a portion extending cantilever fashion beyond one of the members, a carriage swingably mounted on the cantilever portion of the rod, means on the carriage for supporting a strip material supply roll, strip material feed means on the carriage, and drive means for the feed means including an element coaxial to the rod having connection with the supporting structure for actuation of the feed means during rotation of the carrier on the structure.

19. In combination in a servicer for supplying strip material to a tire building machine, a supporting frame, a wheel mounted on the frame for rotation about a substantially horizontal axis, a plurality of rods spaced circumferentially about the wheel for rotation therewith in a substantially circular path and journaled in the wheel for rotation about substantially parallel substantially horizontal axes, each rod having a portion extending cantilever fashion beyond one side of the wheel, carriages mounted on the cantilever portions of the rods in swinging relation to the wheel in the provision of a Ferris-wheel structure, means on the carriages for supporting supply rolls of strip material, means on the carriages for supporting liner material take-up rolls, means on the carriages for withdrawing strip material from supported supply rolls, and means interconnecting the strip material withdrawing means and the frame for actuation of the strip withdrawing means during rotation of the carrier.

20. In combination in a servicer for supplying strip material to a tire building machine or the like, a supporting frame, a carrier wheel mounted on the frame for rotation about a substantially horizontal axis, a plurality of carriages on the wheel, each carriage being mounted for swinging motion about a substantially horizontal axis whereby the frame, carrier and carriages provide a Ferris-wheel-like structure, means on each carriage for supporting strip material supply and liner material take-up rolls, and means on each carriage having driving connection with the frame operating to draw strip material off a supported supply roll and to rotate a supported take-up roll in unison with the drawing of strip material off a supported supply roll during rotation of the carrier on the frame.

21. In combination in a servicer for supplying strip material to a tire building machine or the like, a supporting frame, a carrier wheel mounted on the frame for rotation about a substantially horizontal axis, a plurality of carriages on the wheel, each carriage being mounted for swinging motion about a substantially horizontal axis whereby the frame, carrier and carriages provide a Ferris-wheel-like structure, means on each carriage for supporting a strip material supply roll, and means on each carriage having driving connection with the frame operating to draw strip material off a supported supply roll during rotation of the carrier on the frame.

22. In combination in a servicer for supplying strip material to a tire building machine or the like, a supporting frame, a carrier wheel mounted on the frame for rotation about a substantially horizontal axis, a plurality of carriages on the wheel, each carriage being mounted for swinging motion about a substantially horizontal axis whereby the frame, carrier and carriages provide a Ferris-wheel-like structure, means for rotating the carrier intermittently to advance the carriages sequentially to a common station, means on each carriage for supporting a strip material supply roll, means on each carriage operating to draw strip material from a supported roll during rotation of the carrier, and means coacting between the frame and each of the carriages to locate each carriage in predetermined position relative to the frame at said station and to prevent swinging of the carriages at such station.

23. In combination in a servicer for supplying strip material to a tire building machine or the like, a supporting frame, a carrier wheel mounted on the frame for rotation about a substantially horizontal axis, a plurality of carriages on the wheel, each carriage being mounted for swinging motion about a substantially horizontal axis whereby the frame, carrier and carriages provide a Ferris-wheel-like structure effecting substantially circular path travel of the carriages during rotation of the wheel, means on each carriage for supporting strip material supply and liner material take-up rolls, guide means on each carriage for engaging strip material from the supply roll and supporting such strip material in a festoon, means on each carriage for withdrawing strip material from a supported supply roll and feeding withdrawn strip material into the festoon, and means operative automatically to actuate the strip material feed means during travel of each carriage over one predetermined portion of its circular path and automatically to interrupt such drive during travel of each carriage over another portion of its said path.

24. In combination in a servicer for supplying strip material to a tire building machine or the like, a supporting frame, a carrier wheel mounted on the frame for rotation about a substantially horizontal axis, a plurality of carriages on the wheel, each carriage being rotatably mounted on the wheel for swinging motion about a substantially horizontal axis whereby the frame, carrier wheel and carriages provide a Ferris-wheel-like structure in which the carriages travel substantially circular paths during rotation of the wheel, means on each carriage for supporting strip supply and liner take-up rolls, feed means on each carriage for drawing strip material off a supported supply roll, means drivingly connecting each feed means and the frame and arranged for actuation of the several feed means during rotation of the wheel, and control means individually governing the feed drive means for the several carriages automatically to establish the feed drives during carriage travel across substantially the lower half of the carriage path and automatically to interrupt such drive during carriage travel across substantially the upper half of the carriage path.

25. In combination in a servicer for supplying strip material to a tire building machine or the like, a Ferris-wheel structure comprising a supporting frame, a carrier mounted on the frame for turning about a substantially horizontal axis, carriages mounted on the carrier for relative turning about substantially horizontal axis, means on each of the carriages for supporting strip supply and liner take-up rolls for turning about spaced, substantially horizontal axes, feed means on each carriage, and drive means actuated by relative movement between the carrier and the supporting frame operative automatically to actuate the several feed means to withdraw a controlled quantity of strip material from each supported supply roll during each revolution of the Ferris-wheel structure in response to movement of said wheel structure.

26. In combination in a servicer having a carrier movably mounted on a supporting structure, a carriage on and movable with the carrier for supporting a roll of strip material, feed means on thee carriage for withdrawing strip material from a supported roll, drive means including a clutch coacting between the feed means and the supporting structure for actuating the feed means during movement of the carrier, and control means for the clutch comprising means responsive to carrier movement for actuating the clutch to establish a driving connection and responsive to withdrawn strip material to interrupt the driving connection.

27. In combination in a servicer having a carrier movably mounted on a supporting structure, a carriage on and movable with the carrier for supporting a roll of strip material, feed means on the carriage for withdrawing strip material from a supported roll, drive means including a clutch coacting between the feed means and the supporting structure for actuating the feed means during movement of the carrier, and control means for the clutch comprising means responsive to carrier movement for actuating the clutch to establish a driving connection and responsive to withdrawn strip material to interrupt the driving connection, said control means also including means for effecting additional actuation of the feed drive during carrier movement independently of the said first mentioned means responsive to carrier movement.

28. In combination in a servicer for supplying strip material to a tire building machine or the like, a supporting structure, a carrier rotatably mounted on the structure, a carriage swingably mounted on the carrier, the carriage including means for supporting a roll of strip material and means for feeding strip material out of a supported roll, the carriage mounting means including a rod, sleeve means embracing the rod and journaled in the carrier, means carried by the sleeve means for driving the latter during rotation of the carrier, means drivingly connecting the sleeve means and the feed means, and power driven means operatively connected to the carrier for rotating the latter on the supporting structure.

29. In combination in a servicer for supplying strip material to a tire building machine, a supporting structure, a carrier comprising spaced members rotatably mounted on the structure, sleeves journaled in the spaced members of the carrier in coaxial relation, a rod journaled in the sleeves, a carriage swingably supported on the rod, means on the carriage for supporting a supply roll of strip material, strip material feed means on the carriage, means coacting between one of the sleeves and the supporting structure to rotate such one sleeve during rotative movement of the carrier, means drivingly connecting the feed means and the other sleeve, and means for connecting and disconnecting the sleeves in establishing a driving relation therebetween.

30. In a strip material servicer, a supporting frame, a shaft journaled in the frame for rotation about a substantially horizontal axis and having cantilever end portions projecting from the frame, a carrier wheel secured on one of the projecting shaft portions, a drive member secured on the other projecting shaft portion, carriages swingably mounted on the carrier wheel in spaced relation in the provision of a Ferris-wheel structure, means on each carriage for supporting strip material supply and liner take-up rolls, and drive means carried by the frame and coacting with the drive member, said drive means being arranged to impart intermittent rotary movements of predetermined magnitude to the shaft and Ferris-wheel structure, said movements each corresponding to the spacing between the carriages whereby to bring the carriages sequentially to a common operating station.

31. In combination in a servicer for supplying strip material to a tire building machine, a supporting structure, a carrier, means movably mounting the carrier on the structure, a plurality of carriages on the carrier, means on each carriage for supporting a supply roll of strip material, feed means on each carriage for withdrawing strip material from a supported supply roll, electric drive means for the carrier, means coacting between the feed means and supporting structure for actuating the feed means during movement of the carrier, and control means governing operation of the carrier drive means, said control means being subject to manual operation for initiating carrier drive and being responsive to predetermined carrier movement for de-energizing the electric drive means and arresting carrier movement.

32. In a servicer for storing a plurality of rolls of flexible strip material and supplying the strips to a common operating station, a supporting structure, a carrier rotatably mounted on the structure, a plurality of carriages mounted on the carrier for individual swinging movement about separate horizontal axes, means on each carriage for mounting strip material supply and liner material take-up rolls, the mounting means for each take-up roll including a rotatable mounting element having driving engagement with the take-up roll, parallel guides on each carriage for supporting strip material in a festoon, one of the guides on each carriage comprising a rotatable guide element, means for imparting intermittent movement to the carrier to bring the carriages sequentially to a common operating station, and means for driving the rotatable mounting and guide elements automatically during carrier movement whereby the rotatable guide elements feed strip material into the festoons and the rotatable mounting elements actuate the take-up rolls during such carrier movement.

33. In a servicer for storing a plurality of rolls of flexible strip material and supplying the strips to a common operating station, a supporting structure, a carrier rotatably mounted on the structure, a plurality of carriages mounted on the carrier for individual swinging movement about separate horizontal axes, means on each carriage for mounting a strip material supply roll for rotation about an axis below the swing axis of the carriage, guides on each carriage for engaging strip material from the roll and supporting the material in a festoon embracing the supply roll, the guides being spaced laterally from the supply roll axis and parallel to one another and to the supply roll axis, and means for imparting intermittent movement to the carrier to bring the carriages sequentially to the common station.

34. In a servicer for storing a plurality of rolls of flexible strip material and supplying the strips to a common operating station, a supporting structure, a carrier rotatably mounted on the structure, a plurality of carriages mounted on the carrier for individual swinging movement about separate horizontal axes, means on each carriage for mounting a strip material supply roll for rotation about an axis below the swing axis of the carriage, guides on each carriage for engaging strip material from the roll and supporting the material in a festoon embracing the supply roll, the guides being spaced laterally from the supply roll axis and parallel to one another and to the supply roll axis, means on each carriage for mounting a liner take-up roll for rotation about an axis above and parallel to the supply roll axis, one of the guides comprising a driven rotatable element frictionally engaging strip material from the supply roll, means for driving the take-up roll in unison with the rotatable element, and means for imparting intermittent movement to the carrier to bring the carriages sequentially to the common station.

35. In a servicer for storing a plurality of rolls of flexible strip material and supplying the strips to a common operating station, a supporting structure, a carrier rotatably mounted on the structure, a plurality of carriages mounted on the carrier, means on each carriage for mounting a strip material supply roll, guides on each carriage located on opposite sides of said supply roll for engaging strip material from said roll and supporting said strip material in a festoon extending from one guide beneath said roll and beneath the other guide to said other guide, the guides on each carriage being parallel to one another and spaced from and parallel to the axis of said supply roll, said one guide on each carriage comprising an element rotatably mounted on the carriage and arranged to receive said strip material from said supply roll and to feed the same to said festoon, means for imparting intermittent movement to the carrier to bring the carriages sequentially to a common operating station, and means for driving the rotatable elements automatically during carrier movement whereby the elements feed strip material into the festoons during such movement.

36. In a tire building apparatus, the combination of: a servicer for flexible strip material including a supporting structure, a carrier mounted on the structure for rotation about a horizontal axis, a plurality of Ferris wheel type carriages rotatably mounted on the carrier in spaced relation for rotation about horizontal axes and arranged to move sequentially to and from a common operating station during rotation of the carrier, means on each carriage for mounting strip supply and liner take-up rolls, the supply roll of each carriage being mounted for rotation about an axis below the axis of rotation of that carriage, a stock guiding table on each carriage pivotally mounted for tilting movement about an axis parallelling the rotational axes of the carriages between a retracted position and an advancing stock guiding position, a support, and cam means coacting between said support and the individual stock guiding tables for shifting the latter between said retracted and advanced positions in response to relative movement between said support and said carrier and for preventing rotation of said carriages at said station.

37. Servicing apparatus for storing a stock of flexible strip material and supplying the same to an operating service station as required, said apparatus comprising a supporting structure, a carrier mounted on the structure for rotation about an axis, a plurality of carriages mounted on the carrier, strip material stock feed rolls rotatably mounted on the carriages, power actuated means carried by the structure and having driving connection with the carrier for imparting intermittent rotating movements of predetermined magnitude and predetermined speed variation to the carrier to bring the carriages sequentially to a common operating service station, feed means to remove strip material from said rolls, and drive means actuated by relative movement between the carrier and the supporting structure operative automatically to actuate the feed means and remove strip material from the stock feed rolls in response to movement of the carriages whereby a predetermined amount of strip material is removed from said rolls each time the carrier is indexed.

38. The apparatus defined in claim 37 wherein said feed means includes a roller which is actuated by said drive means to remove strip material from said stock roll and to deliver the same to said service station.

ROBERT IREDELL.
CHESTER R. KOLK.
EMIL A. SCHREIER.

References Cited in the file of this patent

UNITED STATES PATENTS

| Number | Name | Date |
|---|---|---|
| 1,320,319 | Convery | Oct. 28, 1919 |
| 1,449,093 | Finley | Mar. 20, 1923 |
| 2,045,534 | Stevens | June 23, 1936 |
| 2,282,391 | Bernard | May 12, 1942 |
| 2,333,570 | Hild | Nov. 2, 1943 |
| 2,340,267 | Haase | Jan. 25, 1944 |
| 2,395,020 | Sternad | Feb. 19, 1946 |
| 2,480,704 | Breth | Aug. 30, 1949 |